US010270982B2

(12) United States Patent
Ono

(10) Patent No.: US 10,270,982 B2
(45) Date of Patent: Apr. 23, 2019

(54) IMAGING APPARATUS

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/880,536

(22) Filed: Jan. 26, 2018

(65) Prior Publication Data

US 2018/0152610 A1 May 31, 2018

Related U.S. Application Data

(63) Continuation of application No. PCT/JP2016/064029, filed on May 11, 2016.

(30) Foreign Application Priority Data

Aug. 19, 2015 (JP) ................................ 2015-161766

(51) Int. Cl.
*H04N 5/238* (2006.01)
*G02B 5/00* (2006.01)
(Continued)

(52) U.S. Cl.
CPC ............... *H04N 5/238* (2013.01); *G02B 5/00* (2013.01); *G03B 9/02* (2013.01); *G03B 9/06* (2013.01);
(Continued)

(58) Field of Classification Search
CPC .. H04N 5/238; H04N 5/2254; H04N 5/23212; H04N 5/217; H04N 5/04;
(Continued)

(56) References Cited

U.S. PATENT DOCUMENTS

| | | | |
|---|---|---|---|
| 5,027,202 | A | 6/1991 | Von Hoessle et al. |
| 2006/0266835 | A1 | 11/2006 | Tanida |

(Continued)

FOREIGN PATENT DOCUMENTS

| | | |
|---|---|---|
| DE | 3928244 | 10/1990 |
| JP | 2005-017347 | 1/2005 |

(Continued)

OTHER PUBLICATIONS

"International Search Report (Form PCT/ISA/210) of PCT/JP2016/064029", with English translation thereof, dated Aug. 2, 2016, pp. 1-4.

(Continued)

*Primary Examiner* — Mekonnen D Dagnew
(74) *Attorney, Agent, or Firm* — JCIPRNET

(57) ABSTRACT

An imaging apparatus comprises: an imaging optical-system that includes a first optical-system and a second optical-system having imaging characteristics different from each other and being arranged concentrically; and an image sensor that has a plurality of pixels composed of photoelectric conversion elements two-dimensionally arranged, respectively pupil-divides light incident through the optical-systems, and selectively receives the light by the pixels. With the imaging apparatus, the light amount of the light incident on the image sensor through each of the optical-systems is adjusted, and interference is prevented. The imaging apparatus further comprises a stop including an annular light blocking section of which an inner diameter and an outer diameter can be increased or decreased, and adjusting a light amount of light passing through each of the optical-systems by increasing or decreasing the inner diameter and the outer diameter of the light blocking section at a boundary between pupil regions of the optical-systems.

20 Claims, 38 Drawing Sheets

(51) Int. Cl.

| | |
|---|---|
| ***G03B 9/02*** | (2006.01) |
| ***G03B 9/06*** | (2006.01) |
| ***G03B 19/07*** | (2006.01) |
| ***H04N 5/369*** | (2011.01) |
| ***H04N 5/04*** | (2006.01) |
| ***H04N 5/217*** | (2011.01) |
| ***H04N 5/232*** | (2006.01) |
| ***H04N 5/225*** | (2006.01) |

(52) U.S. Cl.
CPC ............... *G03B 19/07* (2013.01); *H04N 5/04* (2013.01); *H04N 5/217* (2013.01); *H04N 5/2254* (2013.01); *H04N 5/23212* (2013.01); *H04N 5/369* (2013.01)

(58) Field of Classification Search
CPC .......... H04N 5/369; G02B 5/00; G03B 19/07; G03B 9/06; G03B 9/02
See application file for complete search history.

(56) References Cited

U.S. PATENT DOCUMENTS

2015/0207990 A1* 7/2015 Ford .................... H04N 5/2254 348/262
2016/0269667 A1 9/2016 Ono
2018/0103839 A1* 4/2018 Kurtz ................... A61B 3/0008
2018/0284459 A1* 10/2018 Calm ................. G02B 27/0189

FOREIGN PATENT DOCUMENTS

JP 2006-333120 12/2006
JP 2007-086221 4/2007
JP 2013-046303 3/2013
JP 2015-119456 6/2015
WO 2015122117 8/2015

OTHER PUBLICATIONS

"Written Opinion (Form PCT/ISA/237)", dated Aug. 2, 2016, with English translation thereof, pp. 1-9.
"Search Report of European Counterpart Application" dated Jun. 14, 2018, p. 1-p. 4.

* cited by examiner

FIG. 38

$$\begin{pmatrix} W1 \\ T1 \end{pmatrix} = \underbrace{\begin{pmatrix} A & B \\ C & D \end{pmatrix}^{-1}}_{M^{-1}} * \begin{pmatrix} W2 \\ T2 \end{pmatrix}$$

FIG. 39

$$W1 = \begin{pmatrix} w1\_11 & w1\_12 & w1\_13 & & \\ w1\_21 & w1\_22 & & & \\ w1\_31 & & \ddots & & \\ & & & & \\ & & & & w1\_mn \end{pmatrix}$$

FIG. 40

$$w1\_ij = \frac{dij \cdot w2\_ij - bij \cdot t2\_ij}{aij \cdot dij - bij \cdot cij}$$

FIG. 41

$$t1\_ij = \frac{-cij \cdot w2\_ij + aij \cdot t2\_ij}{aij \cdot dij - bij \cdot cij}$$

IMAGING APPARATUS

CROSS-REFERENCE TO RELATED APPLICATIONS

This application is a Continuation of PCT International application Ser. No. PCT/JP2016/064029 filed on May 11, 2016, which claims priority under 35 U.S.C. § 119(a) to Japanese Patent Application No. 2015-161766 filed on Aug. 19, 2015. Each of the above application(s) is hereby expressly incorporated by reference, in its entirety, into the present application.

BACKGROUND OF THE INVENTION

1. Field of the Invention

The present invention relates to an imaging apparatus, and more particularly to a lens device, which is configured such that a first optical system and a second optical system having imaging characteristics different from each other are concentrically combined, and an imaging apparatus which captures two images having imaging characteristics different from each other at the same time by using an image sensor respectively pupil-divides light incident through the first optical system and light incident through the second optical system of the lens device and selectively receiving rays through each pixel thereof.

2. Description of the Related Art

There are known lens devices, each of which is configured such that a first optical system and a second optical system having imaging characteristics different from each other are concentrically combined, and known imaging apparatuses each of which captures two images having imaging characteristics different from each other at the same time by using an image sensor respectively pupil-divides light incident through the first optical system and light incident through the second optical system of the lens device and selectively receiving the light through each pixel thereof (for example, JP2015-119456A). According to the imaging apparatuses, for example, by forming the first optical system as a wide-angle optical system and forming the second optical system as a telephoto optical system, it is possible to capture a wide-angle image and a telephoto image at the same time.

SUMMARY OF THE INVENTION

However, the conventional imaging apparatus has a problem that it is not possible to adjust the light amount since the lens device is not provided with a stop.

In addition, the image sensor of the imaging apparatus selectively receives light from each optical system through each pixel. However, in each pixel, it is difficult to completely separate the light from each optical system and selectively receive the light, and there is a problem that interference occurs. Here, the interference means that the light from the first optical system and the light from the second optical system mix and are received by each pixel. There is a problem that, as interference occurs, an image, on which the image of the other optical system is thinly superimposed, is captured (refer to FIG. 34).

The present invention has been made in view of such circumstances, and an object thereof is to provide an imaging apparatus that is capable of adjusting the light amount of light incident on the image sensor through each optical system and that is capable of preventing interference.

Means for solving the problems are as follows.

(1) An imaging apparatus comprises: an imaging optical system that is configured such that a first optical system and a second optical system having imaging characteristics different from each other are combined concentrically; an image sensor that has a plurality of pixels composed of photoelectric conversion elements two-dimensionally arranged, respectively pupil-divides light incident through the first optical system and light incident through the second optical system, and selectively receives the light through the pixels; an image signal acquisition section that acquires an image signal of a first image obtained through the first optical system and an image signal of a second image obtained through the second optical system, from the image sensor; and a stop that has an annular light blocking section of which an inner diameter and an outer diameter are capable of being increased or decreased, and adjusts a light amount of light passing through the first optical system and the second optical system by increasing or decreasing the inner diameter and the outer diameter of the light blocking section at a boundary between pupil regions of the first optical system and the second optical system.

According to the present aspect, it is possible to adjust the light amount of the light passing through the first optical system and the second optical system through the stop. The stop comprises an annular light blocking section of which an inner diameter and an outer diameter can be increased or decreased, and adjusts a light amount of light passing through the first optical system and the second optical system by increasing or decreasing the inner diameter and the outer diameter of the light blocking section at a boundary between pupil regions of the first optical system and the second optical system. By increasing or decreasing the inner diameter and the outer diameter of the light blocking section at the boundary between the pupil regions of the first optical system and the second optical system in such a manner, the light amount of the light passing through the first optical system and the second optical system is adjusted. Thereby, it is possible to improve separability of light received by each pixel of the image sensor, and therefore interference can be prevented. Consequently, according to a stop of the present aspect, in addition to an original function of adjusting the light amount, a function of preventing interference can also be realized.

(2) In the imaging apparatus of (1), the first optical system and the second optical system have focal lengths different from each other.

According to the present aspect, by forming the first optical system and the second optical system as the optical systems having focal lengths different from each other, it is possible to capture two images having focal lengths different from each other at the same time.

(3) In the imaging apparatus of (1), the first optical system and the second optical system have focusing distances different from each other.

According to the present aspect, by forming the first optical system and the second optical system as the optical systems having focusing distances different from each other, it is possible to capture two images having focusing distances different from each other at the same time. The focusing distance is a distance from a light receiving surface of the image sensor to the subject which is being focused by the image sensor.

(4) In the imaging apparatus of (1), the first optical system and the second optical system have transmission wavelength characteristics different from each other.

According to the present aspect, by forming the first optical system and the second optical system as the optical systems having transmission wavelength characteristics different from each other, it is possible to capture two images having transmission wavelength characteristics different from each other at the same time.

(5) In the imaging apparatus of any one of (1) to (4), the stop is composed of liquid crystal elements.

According to the present aspect, by adopting a configuration in which the stop is composed of liquid crystal elements, it is possible to easily realize a stop comprising an annular light blocking section capable of increasing or decreasing the inner diameter and the outer diameter.

(6) In the imaging apparatus of any one of (1) to (4), the stop has a plurality of fulcrums that are arranged with regular intervals on a same circumference, a plurality of stop blades that are swingably supported by the fulcrums, are arranged to overlap, and compose the light blocking section, and a stop blade driving section that swings the stop blades synchronously. The inner diameter and the outer diameter of the light blocking section are increased or decreased by swinging the stop blades synchronously through the stop blade driving section.

According to the present aspect, the stop is configured to comprise the plurality of fulcrums that are arranged with regular intervals on a same circumference, the plurality of stop blades that are swingably supported by the fulcrums, are arranged to overlap, and compose the light blocking section, and the stop blade driving section that swings the stop blades synchronously. The stop increases or decreases the inner diameter and the outer diameter of the light blocking section by swinging the stop blades synchronously through the stop blade driving section. Thus, it is possible to adjust the light amount of the light passing through the first optical system and the second optical system.

(7) In the imaging apparatus of any one of (1) to (4), the stop is configured to have, on the same axis, a first stop that has a first light blocking section which has an annular shape and of which an inner diameter is increased or decreased, and a second stop that has a second light blocking section which has an annular shape and of which an outer diameter is increased or decreased. The first stop adjusts a light amount of light passing through the first optical system. The second stop adjusts a light amount of light passing through the second optical system.

According to this aspect, the stop is configured to have, on the same axis, the first stop that has a first light blocking section which has an annular shape and of which an inner diameter is increased or decreased, and the second stop that has a second light blocking section which has an annular shape and of which an outer diameter is increased or decreased. In this case, the first light blocking section and the second light blocking section are combined to compose one light blocking section. The light amount of the light passing through the first optical system is adjusted by the first stop, and the light amount of the light passing through the second optical system is adjusted by the second stop.

(8) In the imaging apparatus of (7), the first stop has a plurality of first fulcrums that are arranged with regular intervals on a same circumference, a plurality of first stop blades that are swingably supported by the first fulcrums, are disposed to overlap, and compose the first light blocking section, and a first stop blade driving section that swings the first stop blades synchronously. The inner diameter of the first light blocking section is increased or decreased by swinging the first stop blades synchronously through the first stop blade driving section.

According to the present aspect, the first stop is configured to comprise the plurality of first fulcrums that are arranged with regular intervals on a same circumference, the plurality of first stop blades that are swingably supported by the first fulcrums, are disposed to overlap, and compose the first light blocking section, and the first stop blade driving section that swings the first stop blades synchronously. The first stop increases or decreases the inner diameter of the first light blocking section by swinging the first stop blades synchronously through the first stop blade driving section.

(9) In the imaging apparatus of (7) or (8), the second stop has a plurality of second fulcrums that are arranged with regular intervals on a same circumference, a plurality of second stop blades that are swingably supported by the second fulcrums, are disposed to overlap, and compose the second light blocking section, and a second stop blade driving section that swings the second stop blades synchronously. The outer diameter of the second light blocking section is increased or decreased by swinging the second stop blades synchronously through the second stop blade driving section.

According to the present aspect, the second stop is configured to comprise the plurality of second fulcrums that are arranged with regular intervals on a same circumference, the plurality of second stop blades that are swingably supported by the second fulcrums, are disposed to overlap, and compose the second light blocking section, and the second stop blade driving section that swings the second stop blades synchronously. The second stop increases or decreases the outer diameter of the second light blocking section by swinging the second stop blades synchronously through the second stop blade driving section.

(10) The imaging apparatus according to any one of (1) to (9) further comprises an image signal processing section that acquires an image signal of the first image and an image signal of the second image, and performs processing of eliminating an effect of interference caused by the second optical system from the first image and processing of eliminating an effect of interference caused by the first optical system from the second image.

According to the present aspect, the imaging apparatus further comprises the image signal processing section that acquires an image signal of the first image and an image signal of the second image, and performs processing of eliminating an effect of interference caused by the second optical system from the first image and processing of eliminating an effect of interference caused by the first optical system from the second image. Thereby, it is possible to eliminate the effect of interference which can not be completely prevented even by the stop, and it is possible to capture high quality images.

(11) In the imaging apparatus of (10), the image signal processing section changes image processing parameters in accordance with a light amount adjusted by the stop.

According to the present aspect, in a case where the image signal processing section performs image processing, the image processing parameters are changed in accordance with a light amount adjusted by the stop. It is possible to improve separability of the light received by each pixel of the image sensor as the aperture of the stop is reduced. That is, an interference ratio, which is a ratio of mixed and received light from each optical system, changes in accordance with the light amount to be adjusted by the stop. Accordingly, by changing the image processing parameters in accordance with the light amount to be adjusted by the stop, appropriate image signal processing can be performed, and higher quality images can be acquired.

According to the present invention, it is possible to adjust the light amount of light incident on the image sensor through each optical system, and it is possible to prevent interference.

BRIEF DESCRIPTION OF THE DRAWINGS

FIG. 38 is a diagram illustrating a determinant expressing the determinant of FIG. 37 in a simplified mariner.

FIG. 39 is a diagram illustrating elements w1_11 to w1_2mn composing "W1" shown in FIG. 38.

FIG. 40 is a diagram illustrating a calculation expression of "w1_ij" derived on the basis of the determinant shown in FIG. 38.

FIG. 41 is a diagram illustrating a calculation expression of "t1_ij" derived on the basis of the determinant shown in FIG. 38.

DESCRIPTION OF THE PREFERRED EMBODIMENTS

Hereinafter, preferred embodiments of the present invention will be described in detail with reference to the accompanying drawings.

First Embodiment

[Configuration of Imaging Apparatus of First Embodiment]

Figure 1:
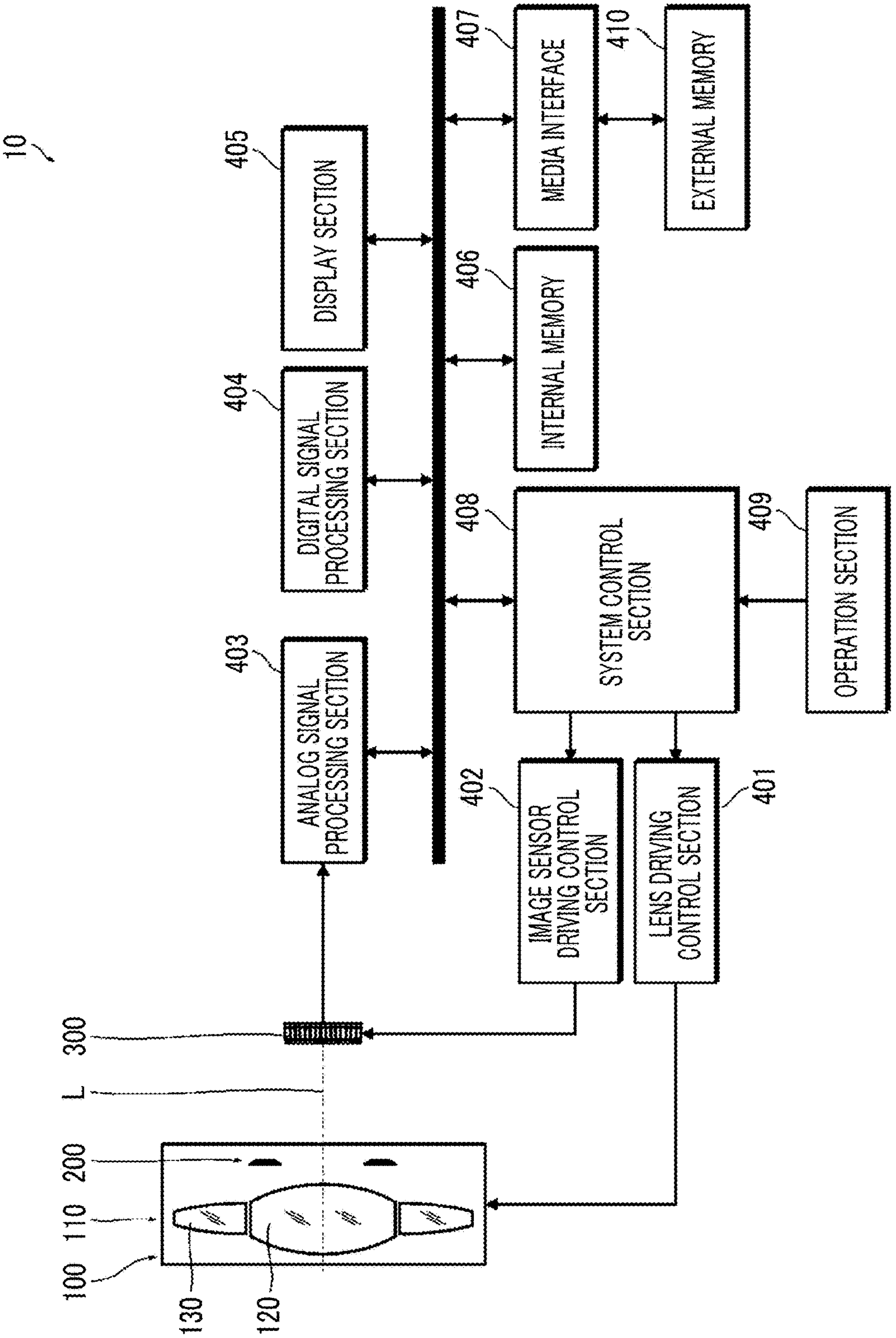
FIG. 1 is a block diagram illustrating a schematic configuration of a first embodiment of an imaging apparatus.

FIG. 1 is a block diagram illustrating a schematic configuration of a first embodiment of an imaging apparatus.

The imaging apparatus 10 is configured to mainly comprise a lens device 100, an image sensor 300, a lens driving control section 401, an image sensor driving control section 402, an analog signal processing section 403, a digital signal processing section 404, a display section 405, an internal memory 406, a media interface 407, a system control section 408, and an operation section 409.

<<Lens Device>>

Figure 2:
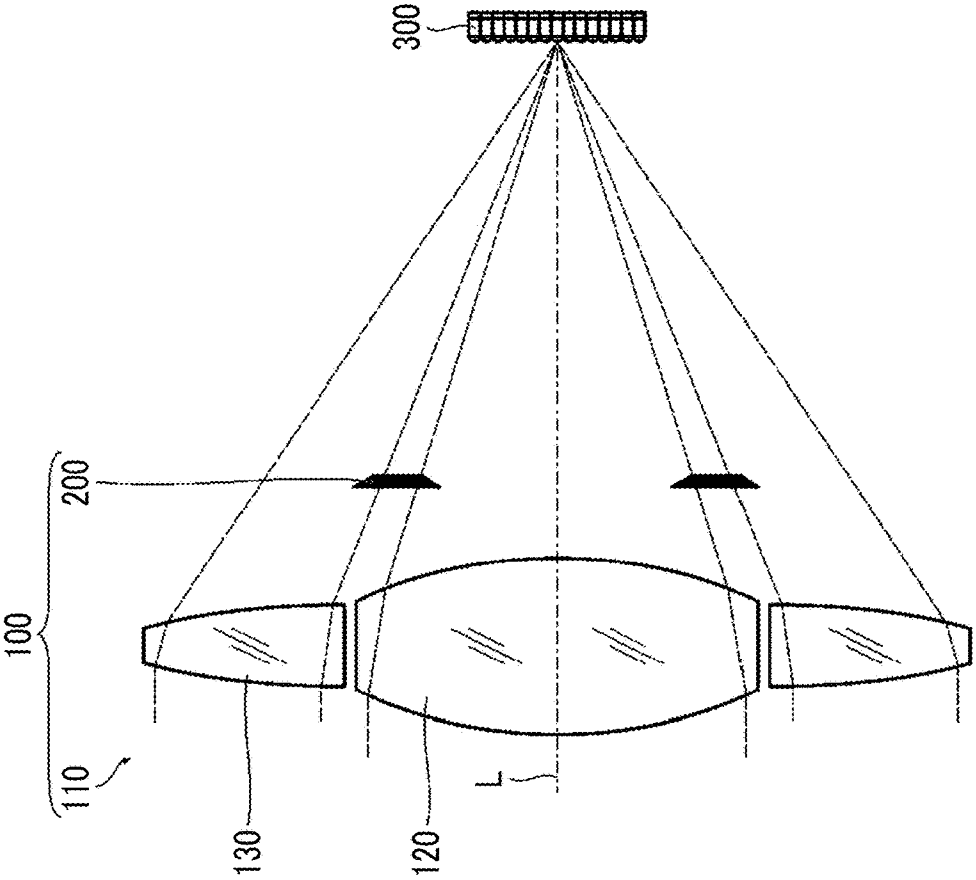
FIG. 2 is a schematic configuration diagram of a lens device.

FIG. 2 is a schematic configuration diagram of a lens device.

The lens device 100 is configured to comprise an imaging optical system 110 and a stop 200.

<Imaging Optical System>

The imaging optical system 110 is configured such that the first optical system 120 and the second optical system 130 having imaging characteristics different from each other are combined concentrically. The first optical system 120 is composed of a circular lens having a first imaging characteristic, and is disposed at the center. The second optical system 130 is composed of an annular lens having a second imaging characteristic and is disposed on the outer periphery of the first optical system 120 such that the center thereof is the same as that of the first optical system 120. Accordingly, the first optical system 120 and the second optical system 130 have a common optical axis L. The first optical system 120 and the second optical system 130 are disposed in a lens barrel which is not shown.

In the imaging optical system 110 according to the present embodiment, the first optical system 120 and the second optical system 130 are composed of optical systems having focal lengths different from each other. Specifically, the first optical system 120 is composed of an optical system having a shorter focusing distance than that of the second optical system 130. Therefore, in the imaging optical system 110 of the present embodiment, an image focused on a subject at a short distance is captured by the first optical system 120, and an image focused on a subject at a long distance is captured by the second optical system 130.

In the example shown in FIG. 2, for the sake of convenience, the first optical system 120 and the second optical system 130 each are represented by one lens, but the first optical system 120 and the second optical system 130 each may be composed by combining a plurality of lenses.

<Stop>

The stop 200 adjusts a light amount of light passing through the first optical system 120 and the second optical system 130.

[Configuration of Stop]

Figure 3:
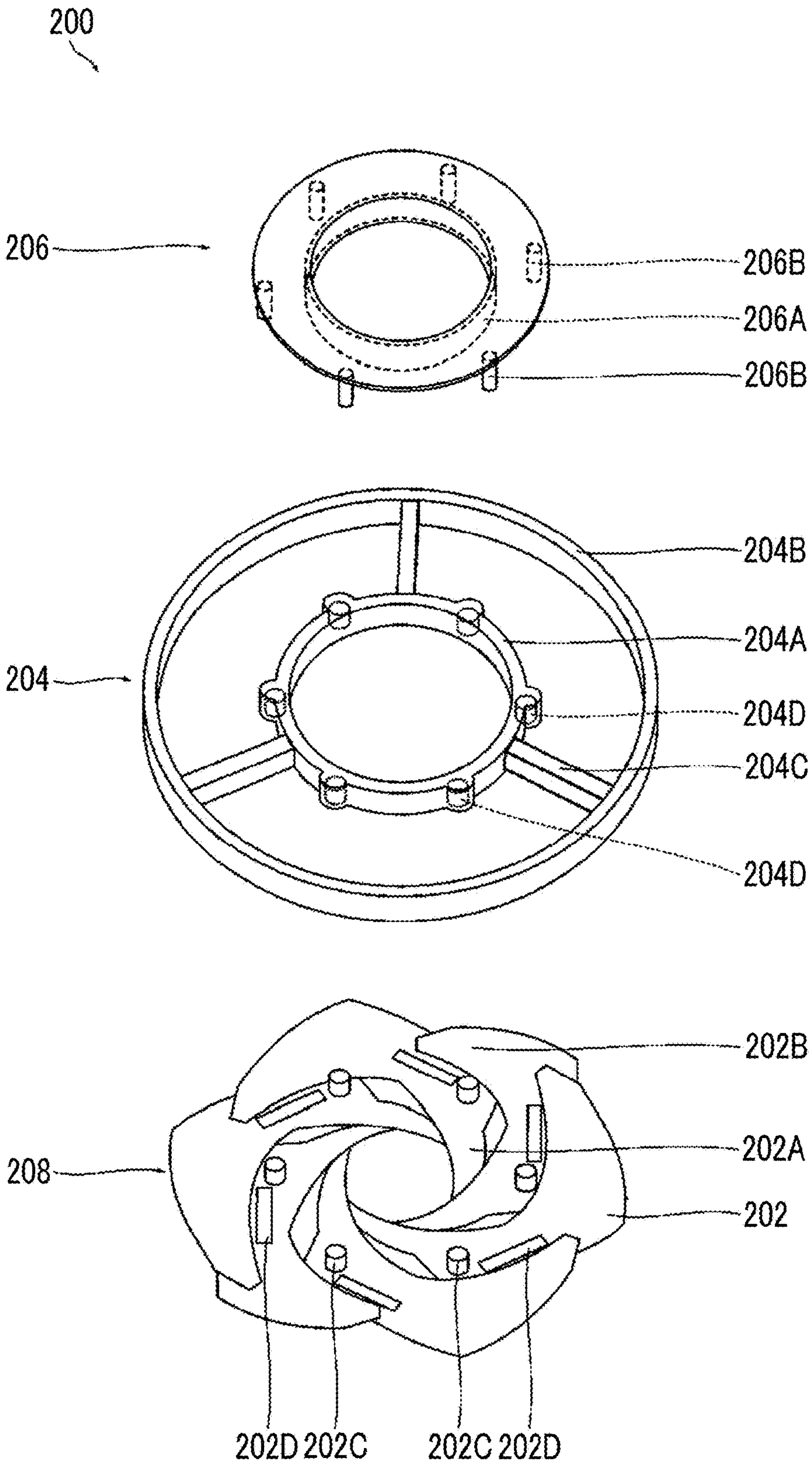
FIG. 3 is an exploded perspective view of a stop.
Figure 4:
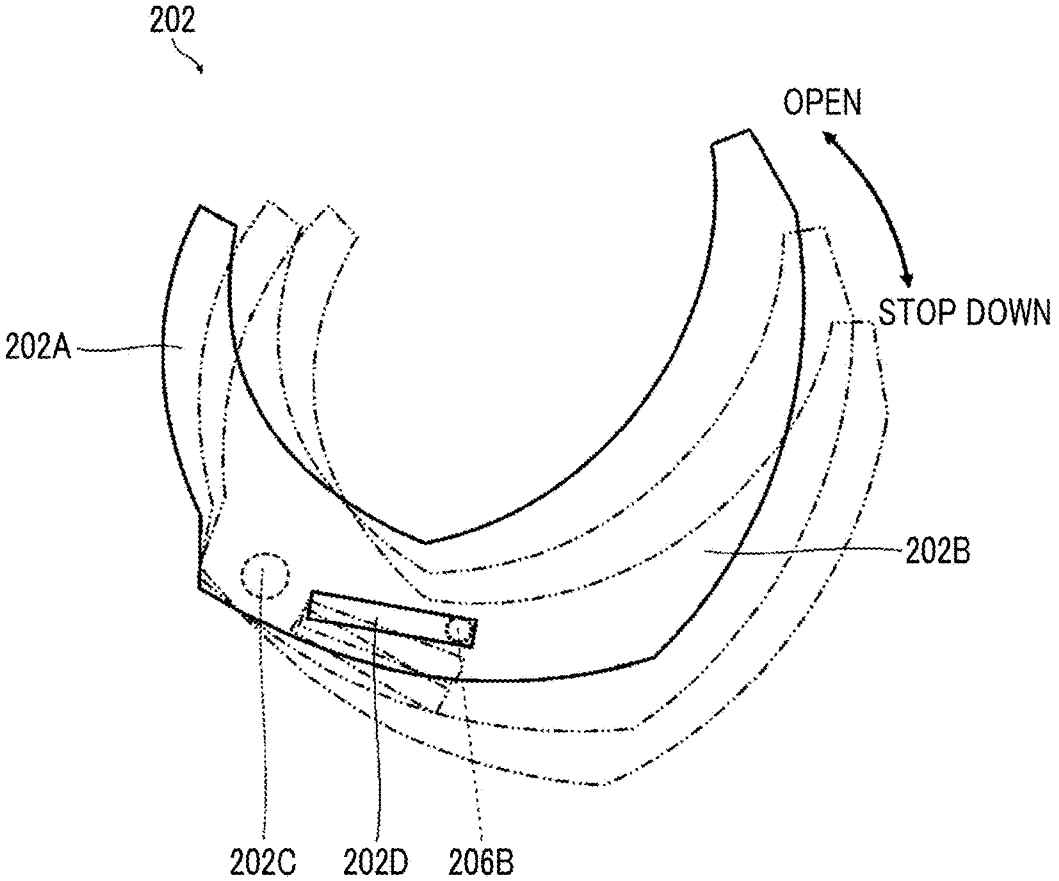
FIG. 4 is a front view of a stop blade composing a stop.

FIG. 3 is an exploded perspective view of a stop. FIG. 4 is a front view of a stop blade composing a stop, and FIG. 5 is a front view illustrating a configuration of arrangement of stop blades.

As shown in FIG. 3, the stop 200 is configured to mainly comprise a plurality of stop blades 202, a stop blade supporting member 204 that swingably supports the plurality of stop blades 202, a stop blade driving member 206 that swings the plurality of stop blades 202 synchronously, and an actuator (not shown in the drawing) that operates the stop blade driving member 206.

All the stop blades 202 have the same shape. As shown in FIG. 4, each stop blade 202 has an arc shape as a whole, and has a first blade portion 202A at one end and a second blade portion 202B at the other end. As will be described later, the first blade portion 202A has a function of increasing and decreasing the inner diameter of the light blocking section 208, and the second blade portion 202B has a function of increasing and decreasing the outer diameter of the light blocking section 208.

Figure 5:
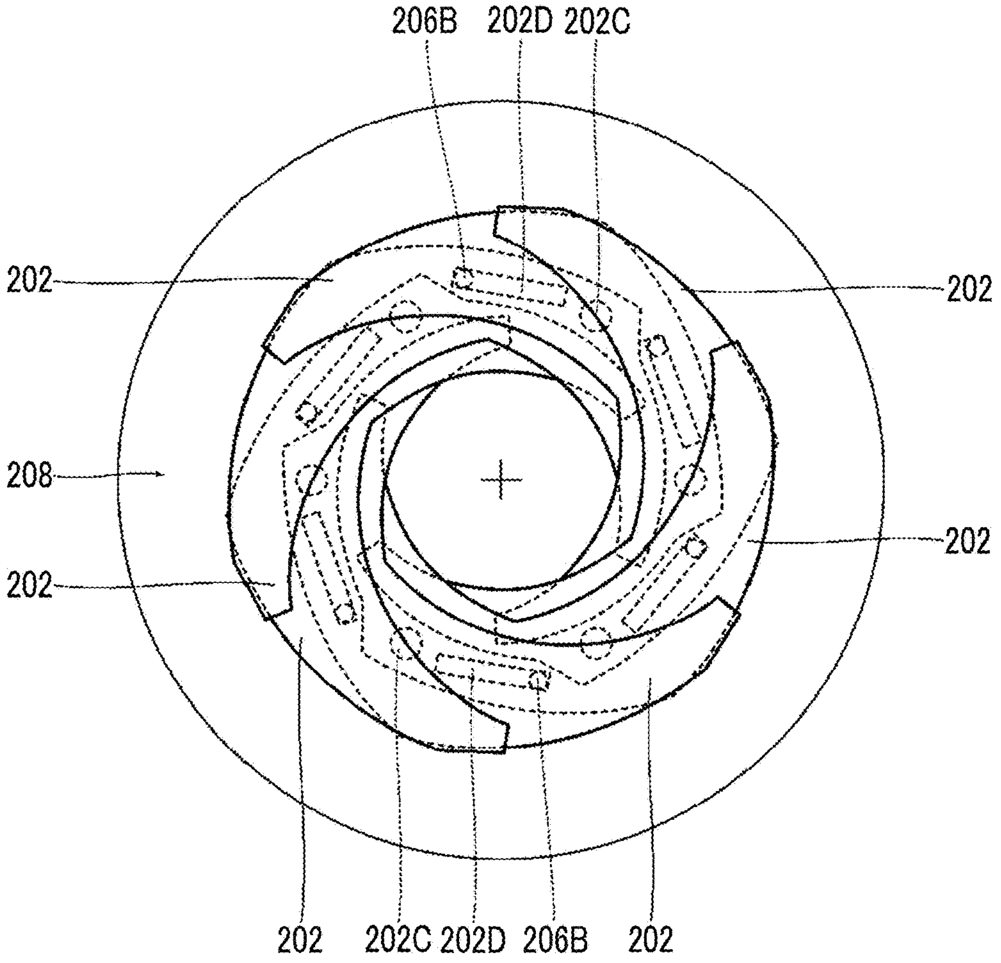
FIG. 5 is a front view illustrating a configuration of arrangement of stop blades.

As shown in FIG. 5, the stop blades 202 are arranged with regular intervals on the same circumference, and the adjacent stop blades 202 are arranged to overlap with each other. The stop blades 202 arranged in such a manner form the light blocking section 208 having an annular shape as a whole. FIG. 5 shows a state in which the stop 200 is released, that is, a state in which the stop 200 is fully opened. In this case, the outer diameter of the light blocking section 208 is minimized, and the inner diameter thereof is maximized.

The stop blade supporting member 204 is disposed coaxially with the light blocking section 208. As shown in FIG. 3, the stop blade supporting member 204 is configured to comprise an inner frame 204A, an outer frame 204B, three support arms 204C, and bearings 204D. Both the inner frame 204A and the outer frame 204B are composed of annular frames, and are arranged concentrically. The three support wins 204C are arranged radially, and connect the inner frame 204A and the outer frame 204B to each other. The bearings 204D are provided in the inner frame 204A, and are arranged with regular intervals in the circumferential direction. Each bearing 204D composes a fulcrum.

The stop 200 is held by the outer frame 204B composing the stop blade supporting member 204, and is disposed in a lens barrel which is not shown.

Each swing shaft 202C, which can be fitted into the bearing 204D, is provided at the base end section of each stop blade 202. The swing shaft 202C is disposed between the first blade portion 202A and the second blade portion 202B. Each stop blade 202 is swingably supported by the stop blade supporting member 204 by fitting the swing shaft 202C into the bearing 204D.

The stop blade driving member 206 is disposed coaxially with the light blocking section 208. As shown in FIG. 3, the stop blade driving member 206 is composed of an annular plate material, and comprises a fitting portion 206A having an annular shape at the inner peripheral portion thereof. By fitting the fitting portion 206A into the inner peripheral portion of the stop blade supporting member 204, the stop blade driving member 206 is disposed coaxially with the stop blade supporting member 204 and the light blocking section 208, and is supported swingably in the circumferential direction.

The stop blade driving member 206 comprises a plurality of cam pins 206B. The cam pins 206B are arranged with regular intervals on the same circumference.

Each of the stop blades 202 comprises a cam groove 202D. The cam pin 206B is fitted into each of the cam grooves 202D. In a case where the cam pin 206B is fitted into each of the cam grooves 202D, the stop blade driving member 206 is swung, and then the stop blades 202 swing in conjunction with the motion of the stop blade driving member 206.

The cam grooves 202D, the cam pins 206B, and the stop blade driving member 206 compose a stop blade driving section for synchronously swinging the stop blades 202.

The actuator, which is not shown, is composed of, for example, a motor, and swings the stop blade driving member 206 in the circumferential direction. For example, the actuator swings the stop blade driving member 206 step by step in accordance with a preset aperture value. Thereby, the inner diameter and the outer diameter of the light blocking section 208 increase or decrease in accordance with the aperture value.

[Operation of Stop]

Figure 6:
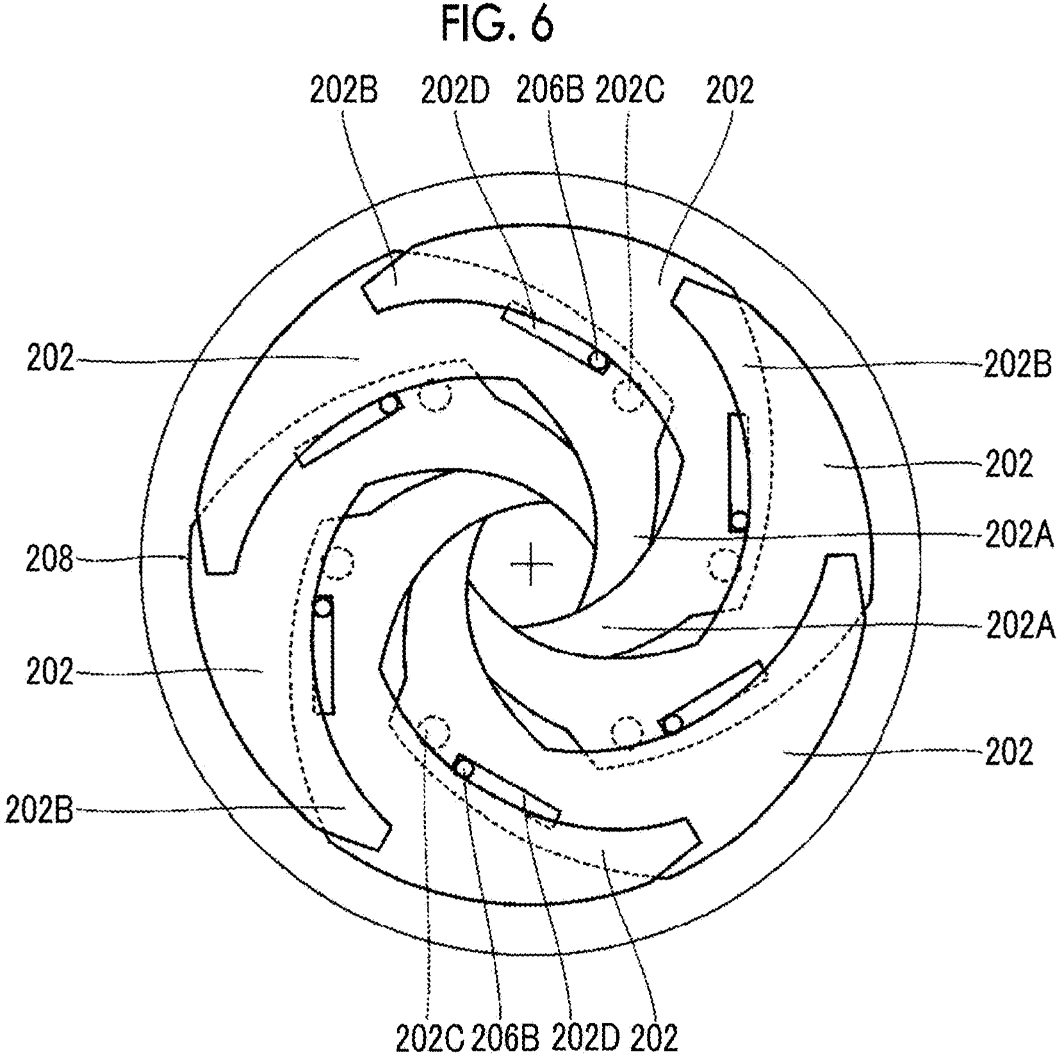
FIG. 6 is an explanatory diagram of the operation of the stop.

FIG. 6 is an explanatory diagram of the operation of the stop.

In a case where the stop blade driving member 206 is swung, all the stop blades 202 swing synchronously around the bearing 204D as the fulcrum by the action of the cam pins 206B and the cam grooves 202D.

Here, in a case where the stop blade 202 is swung from the open state shown in FIG. 5, as shown in FIG. 6, the first blade portion 202A of each stop blade 202 extends in the inner diameter direction. At the same time, the second blade portion 202B of each stop blade 202 extends in the outer diameter direction. As a result, the inner diameter of the light blocking section 208 is decreased, and the outer diameter thereof is increased.

In this manner, in a case where the stop blades 202 are swung, the stop 200 increases or decreases the inner diameter and the outer diameter of the light blocking section 208. In this case, the inner diameter of the light blocking section 208 is decreased in conjunction with the increase in outer diameter, and the inner diameter thereof is increased in conjunction with the decrease in outer diameter. Thereby, in the inside region of the light blocking section 208, by reducing the aperture of the stop 200, the light blocking region expands from the outside toward the inside, and in the outside region thereof, the light blocking region expands from the inside toward the outside, thereby performing light blocking.

In the stop 200 configured as described above, the light blocking section 208 is disposed so as to block light at the boundary between the pupil regions of the first optical system 120 and the second optical system 130. More specifically, in a state where the stop is released, the light blocking section 208 is disposed so as to block light at the boundary between the pupil regions of the first optical system 120 and the second optical system 130. Thereby, in a case where the aperture of the stop 200 is reduced, the light (light flux) is narrowed from the outside toward the inside of the first optical system 120, and the light (light flux) is narrowed from the inside toward the outside of the second optical system 130.

<<Image Sensor>>

The image sensor 300 is composed of a so-called directional sensor, pupil-divides the light incident through the first optical system 120 and light incident through the second optical system 130, selectively receives light through pixels which are two-dimensionally arranged, and converts the light into an electric signal.

Figure 7:
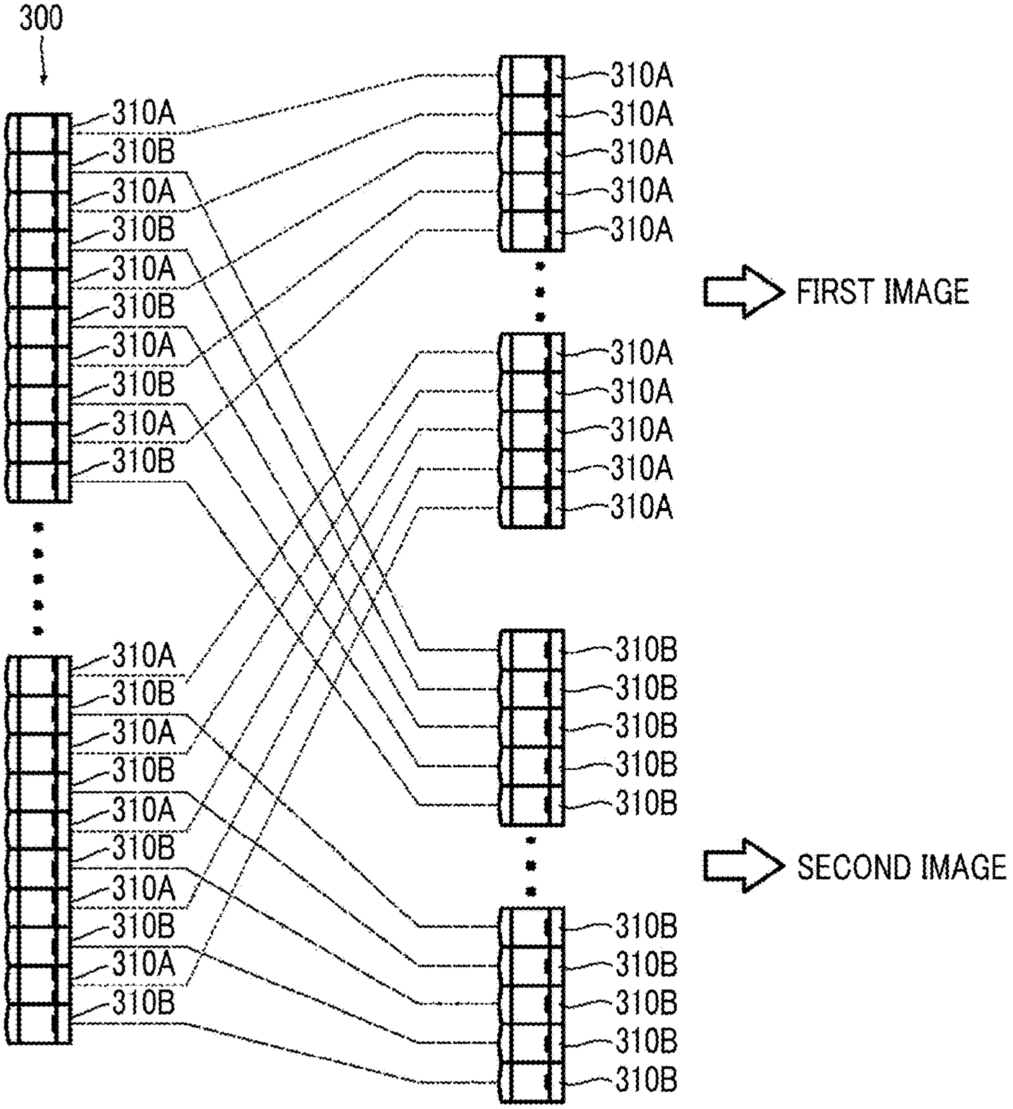
FIG. 7 is a schematic configuration diagram of an image sensor.

FIG. 7 is a schematic configuration diagram of the image sensor.

The image sensor 300 comprises a plurality of pixels composed of photoelectric conversion elements two-dimensionally arranged, respectively pupil-divides the light incident through the first optical system 120 and the light incident through the second optical system 130, and selectively receives the light by the respective pixels. Therefore, the pixels composing the image sensor 300 include first pixels 310A that selectively receive the light passing through the first optical system 120 and second pixels 310B that selectively receive the light passing through the second optical system 130. The first pixels 310A and the second pixels 310B are alternately arranged.

Figure 8:
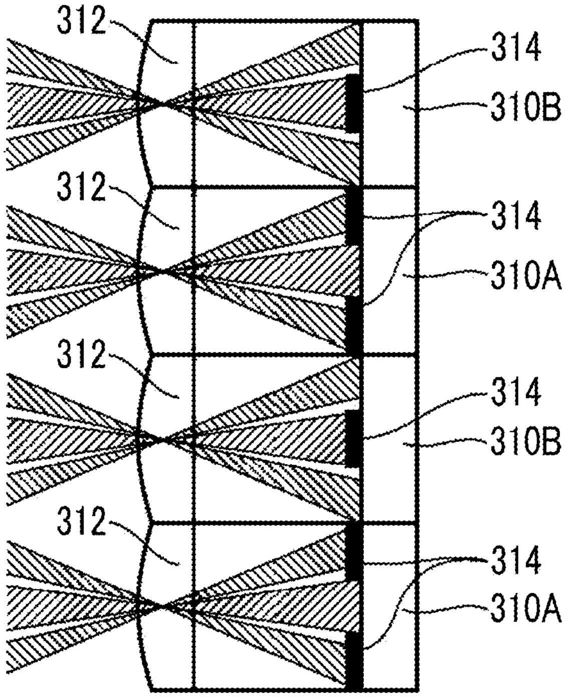
FIG. 8 is a conceptual diagram of a configuration in which light incident through a first optical system and light incident through a second optical system are respectively pupil-divided and selectively received through each pixel.

FIG. 8 is a conceptual diagram of a configuration in which light incident through the first optical system and light incident through the second optical system are pupil-divided and selectively received by each pixel.

In the image sensor 300, each pixel comprises a microlens 312 and a light blocking mask 314.

The microlens 312 is disposed to correspond to the photoelectric conversion element. The microlens 312 composes a pupil image of the first optical system 120 and the second optical system 130 on the photoelectric conversion element.

The light blocking mask 314 is disposed between the microlens 312 and the photoelectric conversion element. The light blocking mask 314 blocks a part of light passing through the microlens 312. The light blocking mask 314 of the first pixel 310A has an annular shape and blocks light passing through the second optical system 130. The light blocking mask 314 of the second pixel 310B has a circular shape and blocks light passing through the first optical system 120.

The image sensor 300 configured as described above is configured such that each pixel has a different sensitivity depending on the incident angle of light. That is, each pixel is configured with angular directivity. The first pixels 310A selectively receive light passing through the first optical system 120, and the second pixels 310B selectively receive light passing through the second optical system 130. Therefore, it is possible to acquire an image signal of an image obtained through the first optical system 120 by acquiring an image signal of the first pixels 310A, and it is possible to acquire an image signal of an image obtained through the second optical system 130 by acquiring an image signal of the second pixels 310B.

In a case of acquiring a color image, the first pixels 310A and the second pixels 310B comprise color filters. The color filters are arranged in a prescribed array. For example, color filters of three colors of red (R), green (G), and blue (B) are arranged in a Bayer array. Thereby, a color image can be acquired.

<<Lens Driving Control Section>>

The lens driving control section 401 controls driving of the lens device 100 on the basis of a command from the system control section 408. That is, opening and closing of the stop 200 is controlled.

<<Image Sensor Driving Control Section>>

The image sensor driving control section 402 controls driving of the image sensor 300 on the basis of a command from the system control section 408. That is, reading of image signals from the image sensor 300 is controlled.

<<Analog Signal Processing Section>>

The analog signal processing section 403 loads an analog image signal of each pixel which is output from the image sensor 300, performs predetermined signal processing on the signal, converts the signal into a digital signal, and outputs the signal.

<<Digital Signal Processing Section>>

The digital signal processing section 404 loads the image signal of each pixel converted into a digital signal, and performs predetermined signal processing on the signal, thereby generating image data. At this time, the digital signal processing section 404 generates the first image data on the basis of the image signals of the first pixels 310A of the image sensor 300, and generates the second image data on the basis of the image signals of the second pixels 310B. The first image data is image data of a first image which is captured through the first optical system 120, and the second image data is image data of a second image which is captured through the second optical system 130.

<<Display Section>>

The display section 405 is composed of, for example, a liquid crystal monitor, and displays captured images and images being captured (so-called live view images). In addition, the display section 405 functions as a graphical user interface (GUI) as necessary.

<<Internal Memory>>

The internal memory 406 is composed of, for example, a random access memory (RAM) and functions as a work memory.

<<Media Interface>>

The media interface 407 reads and writes data from and to the external memory 410 such as a memory card, on the basis of a command from the system control section 408.

<<System Control Section>>

The system control section 408 integrally controls the operation of the entire imaging apparatus. The system control section 408 is composed of a microcomputer comprising, for example, a central processing unit (CPU), a read only memory (ROM), and a RAM, and executes a predetermined control program, thereby controlling the entire imaging apparatus 10. Programs and various data necessary for control are stored in the ROM.

<<Operation Section>>

The operation section 409 is configured to comprise various operation buttons such as a power button and a shutter button, and a driving circuit thereof. Operation information of the operation section 409 is input to the system control section 408. The system control section 408 controls each section, on the basis of the operation information from the operation section 409.

The imaging apparatus 10 is configured as described above. In the imaging apparatus 10 according to the present embodiment, the image sensor driving control section 402, the analog signal processing section 403, and the system control section 408 cooperatively operate, and compose an image signal acquisition section. That is, the image sensor driving control section 402, the analog signal processing section 403, and the system control section 408 cooperatively operate to acquire an image signal of the first image, which is obtained through the first optical system 120, and an image signal of the second image, which is obtained through the second optical system 130, from the image sensor 300. The acquired first image signal and second image signal are stored in the internal memory 406.

[Operation of Imaging Apparatus of First Embodiment]

<<Imaging Operation>>

Imaging for recording an image is executed on the basis of an instruction from the operation section 409. Here, it is assumed that imaging operation execution is instructed by fully pressing the shutter button.

In a case where the shutter button is fully pressed, first, photometric processing is performed. The system control section 408 obtains an EV value (exposure value) on the basis of the image signal obtained from the image sensor 300, and then determines the exposure. That is, the aperture value and the shutter speed at the time of imaging are determined.

In a case where the exposure is determined, processing of recording images is executed. The system control section 408 controls the stop 200 through the lens driving control section 401 so as to set the aperture value to the determined aperture value. Then, the image sensor 300 is exposed at the determined shutter speed, and an image for recording is captured.

The image signal of each pixel obtained by imaging is output from the image sensor 300 to the analog signal processing section 403. The analog signal processing section 403 loads an image signal of each pixel which is output from the image sensor 300, performs predetermined signal processing on the signal, converts the signal into a digital signal, and outputs the signal.

The image signal of each pixel, which is output from the analog signal processing section 403, is loaded on the internal memory 406 and then sent to the digital signal processing section 404. The digital signal processing section 404 performs predetermined signal processing on the obtained image signal, thereby generating first image data and second image data. That is, the first image data, which is image data of the first image, is generated on the basis of the image signal of the first pixels 310A of the image sensor 300, and the second image data, which is image data of the second image, is generated on the basis of the image signal of the second pixels 310B. The generated first image data and second image data are recorded in the external memory 410 through the media interface 407.

As described above, according to the imaging apparatus 10 of the present embodiment, two images of the first and second images can be captured with one shot. In the imaging apparatus 10 of the present embodiment, the first image is an image focused on a subject at a short distance, and the second image is an image focused on a subject at a long distance.

Further, according to the imaging apparatus 10 of the present embodiment, since the stop 200 is provided in the lens device 100, it is possible to easily capture an image with appropriate exposure.

Furthermore, according to the imaging apparatus 10 of the present embodiment, in a case where the stop 200 blocks light at the boundary between the pupil regions of the first optical system 120 and the second optical system 130 and reduces an aperture, the light blocking region is increased and the aperture of the stop is reduced such that the boundary between the pupil regions is increased. As a result, interference can also be prevented. That is, according to the imaging apparatus 10 of the present embodiment, it is possible to adjust the light amounts and prevent interference at the same time. In the following description, this point will be described in more detail.

<<Effect of Interference Prevention by Stop>>

By blocking light at the boundary between the pupil regions of the first optical system 120 and the second optical system 130 as in the lens device 100 of the present embodiment, it is possible to improve separability of the light received by the first pixels 310A and the second pixels 310B, and thus interference can be effectively prevented.

Figure 9:
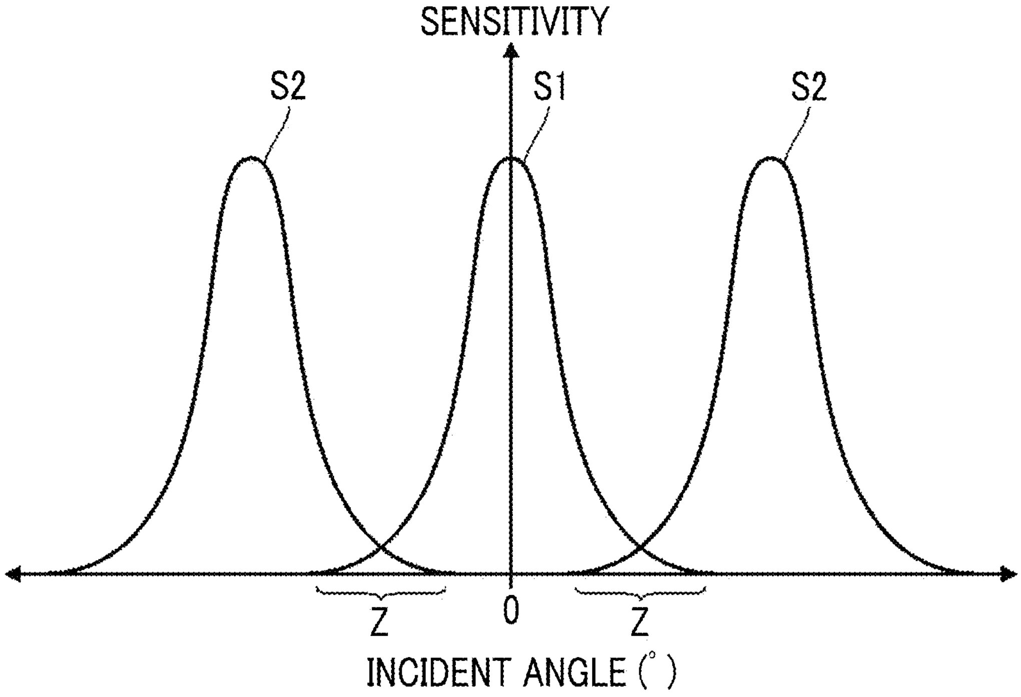
FIG. 9 is a diagram illustrating incident angle sensitivity characteristics of first and second pixels which are adjacent.

FIG. 9 is a diagram illustrating incident angle sensitivity characteristics of first and second pixels which are adjacent.

As described above, the first pixels 310A and the second pixels 310B composing the image sensor 300 have different sensitivities in accordance with the incident angle.

In FIG. 9, the horizontal axis represents the incident angle of light, and the vertical axis represents the sensitivity of the photoelectric conversion element composing the pixel. The incident angle of light, which is incident vertically to the pixel, is set to 0 degree (°).

In FIG. 9, the reference symbol S1 indicates a graph of incident angle sensitivity characteristics of the first pixels 310A. Further, the reference symbols S2 indicate graphs of incident angle sensitivity characteristics of the second pixels 310B. In this case, interference occurs in each incident angle region Z where graphs overlap with each other.

Figure 10A:
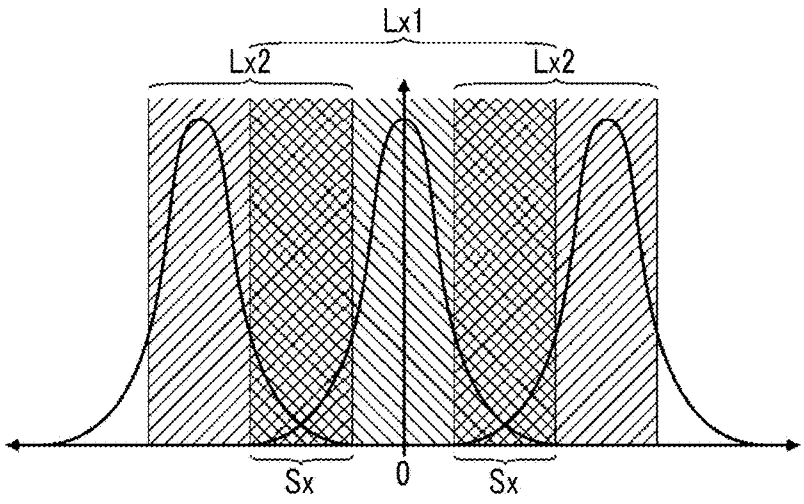
FIGS. 10A to 10C are views for explaining an effect of interference prevention performed by the stop.
Figure 10B:
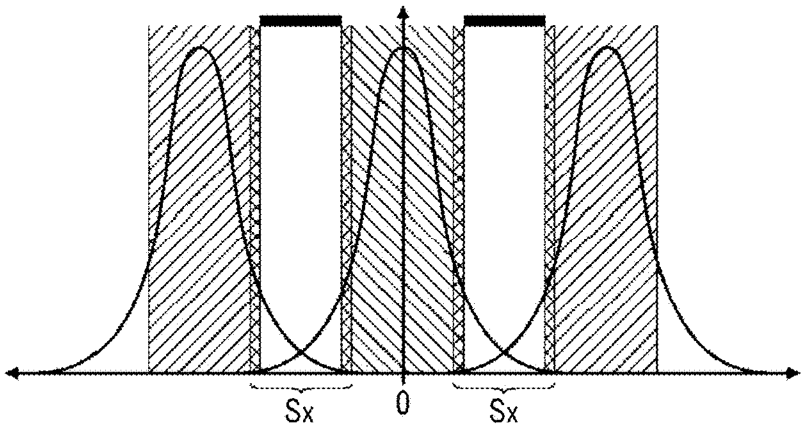
Figure 10C:
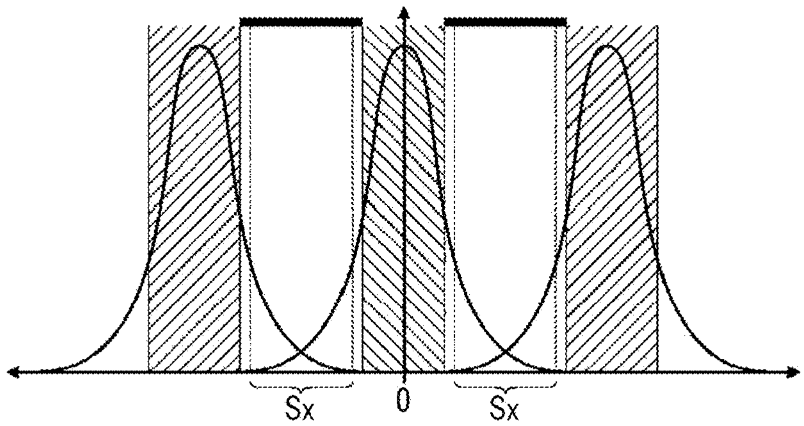

FIGS. 10A to 10C are views for explaining an effect of interference prevention performed by a stop.

FIG. 10A shows the light receiving state of each pixel in a case where there is no stop. Light (light flux), which is incident on the first pixels 310A and the second pixels 310B through the first optical system 120, is indicated by a right oblique line as Lx1, and light (light flux), which is incident on the first pixels 310A and the second pixels 310B through the second optical system 130, is indicated by a left oblique line as Lx2. In this case, interference occurs in each incident angle region Sx where both intersect.

FIG. 10B shows the light receiving state of each pixel in a case where there is a stop. By providing a stop at the boundary between the pupil regions of the first optical system 120 and the second optical system 130 so as to block light in the regions, it is possible to block the light of the incident angle at which interference occurs.

FIG. 10C shows the light receiving state of each pixel in a case where the aperture of the stop is further reduced from the state shown in FIG. 10B, that is, in a case where the light blocking region is further increased. As shown in the drawing, by increasing the light blocking region, it is possible to further block the light of the incident angle at which interference occurs. In other words, the more the aperture of the stop is reduced, the more the light separability can be improved. Thus, interference can be prevented more effectively.

As described above, according to the imaging apparatus 10 of the present embodiment, by providing the stop 200, it is possible to arbitrarily adjust the light amount, and it is possible to eliminate an effect of interference.

[Modification Example of Imaging Apparatus of First Embodiment]

<<Modification Example of Stop>>

The stop may be composed of liquid crystal elements.

Figure 11:
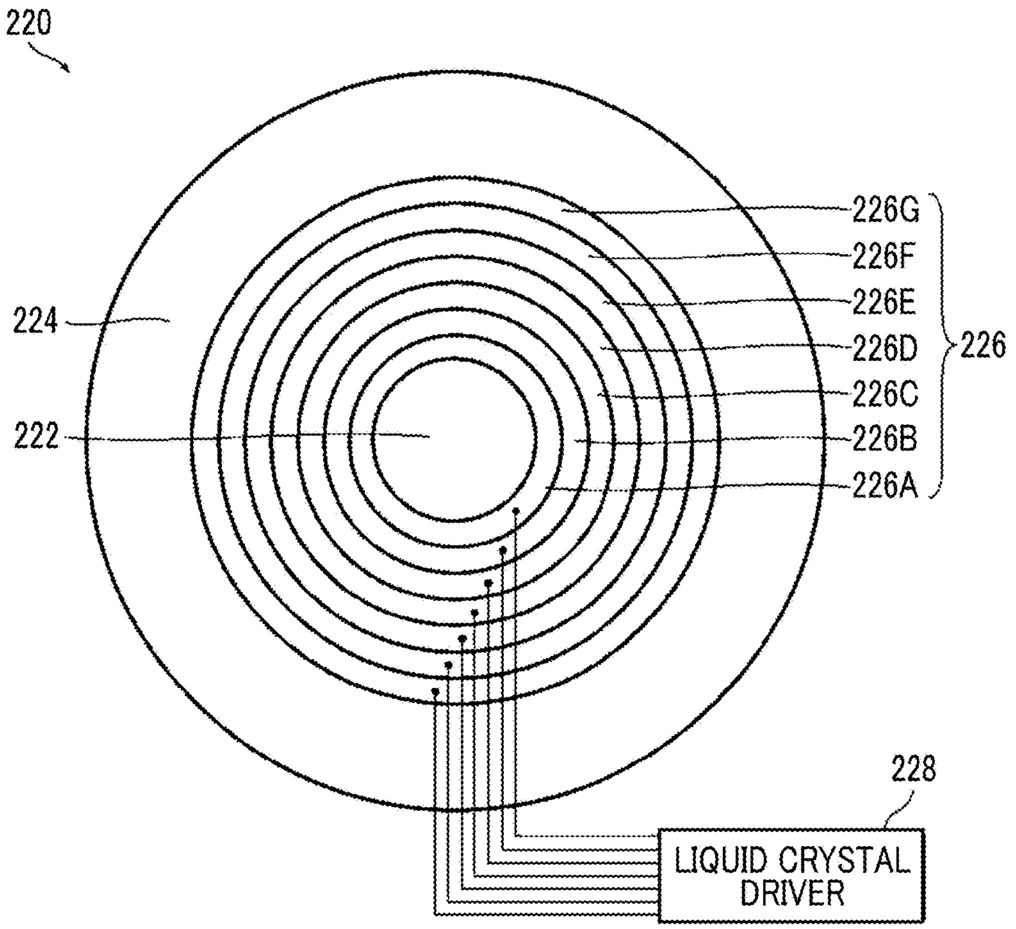
FIG. 11 is a front view illustrating an example of the stop composed of liquid crystal elements.

FIG. 11 is a front view illustrating an example of the stop composed of liquid crystal elements.

The stop 220 of the present example is composed of liquid crystal elements such as super twisted nematic liquid crystal (STN), dual scan super twisted nematic liquid crystal (DSTN), or thin film transistor liquid crystal (TFT).

The stop 220 has a discoid shape, is held by the outer peripheral portion, and is disposed in a lens barrel which is not shown.

The stop 220 comprises a central light transmitting region 222 having a circular shape in the central portion and an outer peripheral light transmitting region 224 having an annular shape in the outer peripheral portion. In addition, an annular light transmitting/blocking switch region 226 is provided between the central light transmitting region 222 and the outer peripheral light transmitting region 224.

The central light transmitting region 222 and the outer peripheral light transmitting region 224 are regions which have translucency and through which light is constantly transmitted.

The light transmitting/blocking switch region 226 is a region where it is possible to arbitrarily switch between the light transmitting state and the light blocking state, and composes a light blocking section capable of increasing or decreasing the inner diameter and the outer diameter. The light transmitting/blocking switch region 226 is configured such that a plurality of annular regions 226A to 226G is concentrically combined. Each of the annular regions 226A to 226G is configured to be capable of individually switching between the light transmitting state and the light blocking state.

Each of the annular regions 226A to 226G composing the light transmitting/blocking switch region 226 is independently controlled by a liquid crystal driver 228 and is set in the light transmitting state or the light blocking state.

In the stop 220 configured as described above, by individually controlling the states of the respective annular regions 226A to 226G composing the light transmitting/blocking switch region 226, the inner diameter and the outer diameter of the light transmitting/blocking switch region 226 as the light blocking section increases or decreases, and thus the aperture amount is adjusted.

Figure 12A:
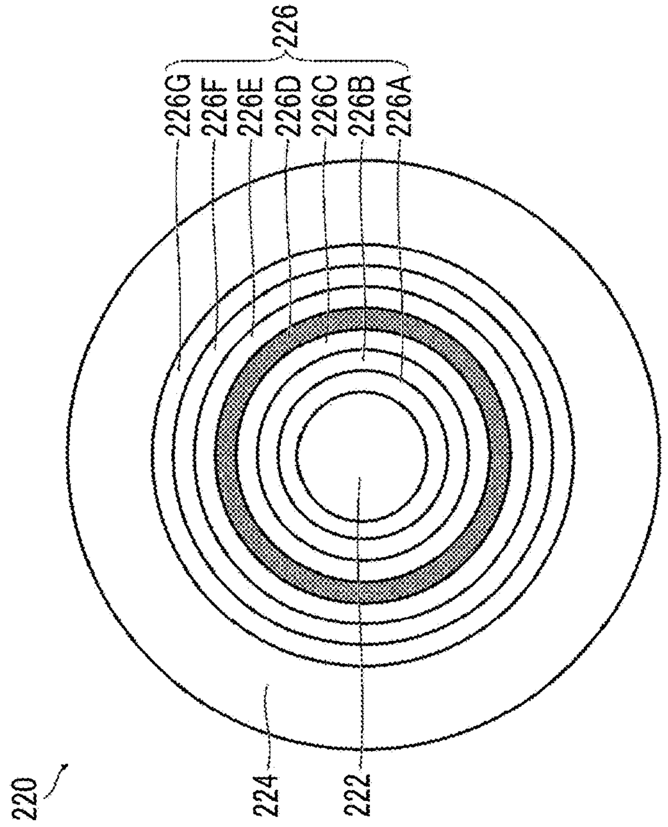
FIGS. 12A and 12B are explanatory diagrams of the operation of the stop composed of liquid crystal elements.
Figure 12B:
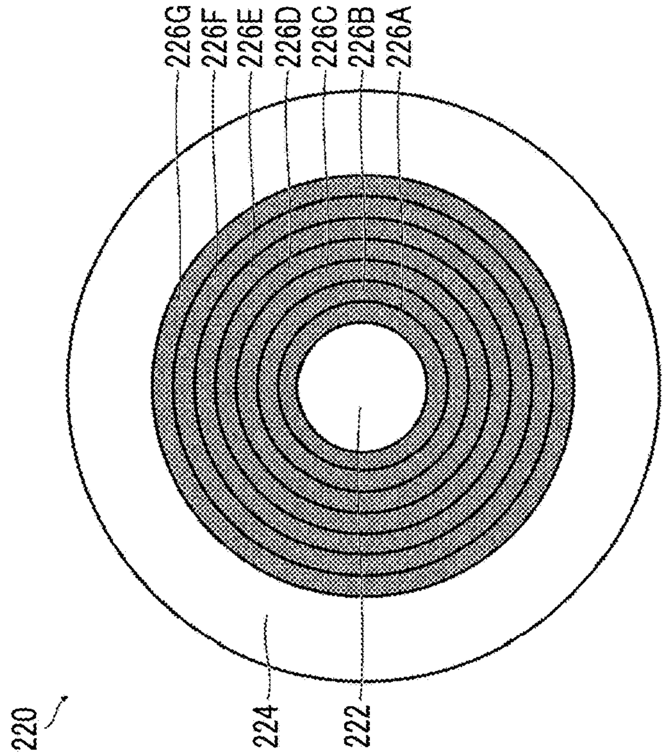

FIGS. 12A and 12B are explanatory diagrams of the operation of the stop composed of liquid crystal elements. FIG. 12A shows a state in which the aperture of the stop is reduced by one stop, and FIG. 12B shows a state in which the aperture of the stop is minimized.

As shown in FIG. 12A, in a case where the aperture of the stop is reduced by one stop, the annular region 226D positioned at the center of the light transmitting/blocking switch region 226 is set in the light blocking state, and the other annular regions 226A to 226C and 226E to 226G are set in the light transmitting state.

As shown in FIG. 12B, in a case where the aperture of the stop is minimized, all the annular regions 226A to 226G composing the light transmitting/blocking switch region 226 are in the light blocking state.

In this manner, in a case where the aperture of the stop 220 is reduced, the light transmitting/blocking state of each annular region 226A to 226G is switched on the basis of the annular region 226D at the center. Thereby, the light passing through the central light transmitting region 222 is blocked by enlarging the light blocking region from the outside to the inside, and the light passing through the outer peripheral light transmitting region 224 is blocked by enlarging the light blocking region from the inside to the outside.

<<Another Modification Example of Stop>>

In the above-mentioned embodiment, the stop may be configured to operate with actuators, but may be manually operated. For example, a lever may be provided on the stop blade driving member, and the lever may be configured to be manually swung.

Further, the stop blade supporting member may be composed of a transparent material. Thereby, it is possible to reduce the effect of light blocking by the supporting member.

In the configuration of the above-mentioned embodiment, the cam pins are provided on the side of the stop blade driving member and the cam grooves are provided on the side of the stop blade. However, it may be possible to adopt a configuration in which cam grooves are provided on the side of the stop blade driving member and cam pins are provided on the side of the stop blades.

Second Embodiment

Figure 13:
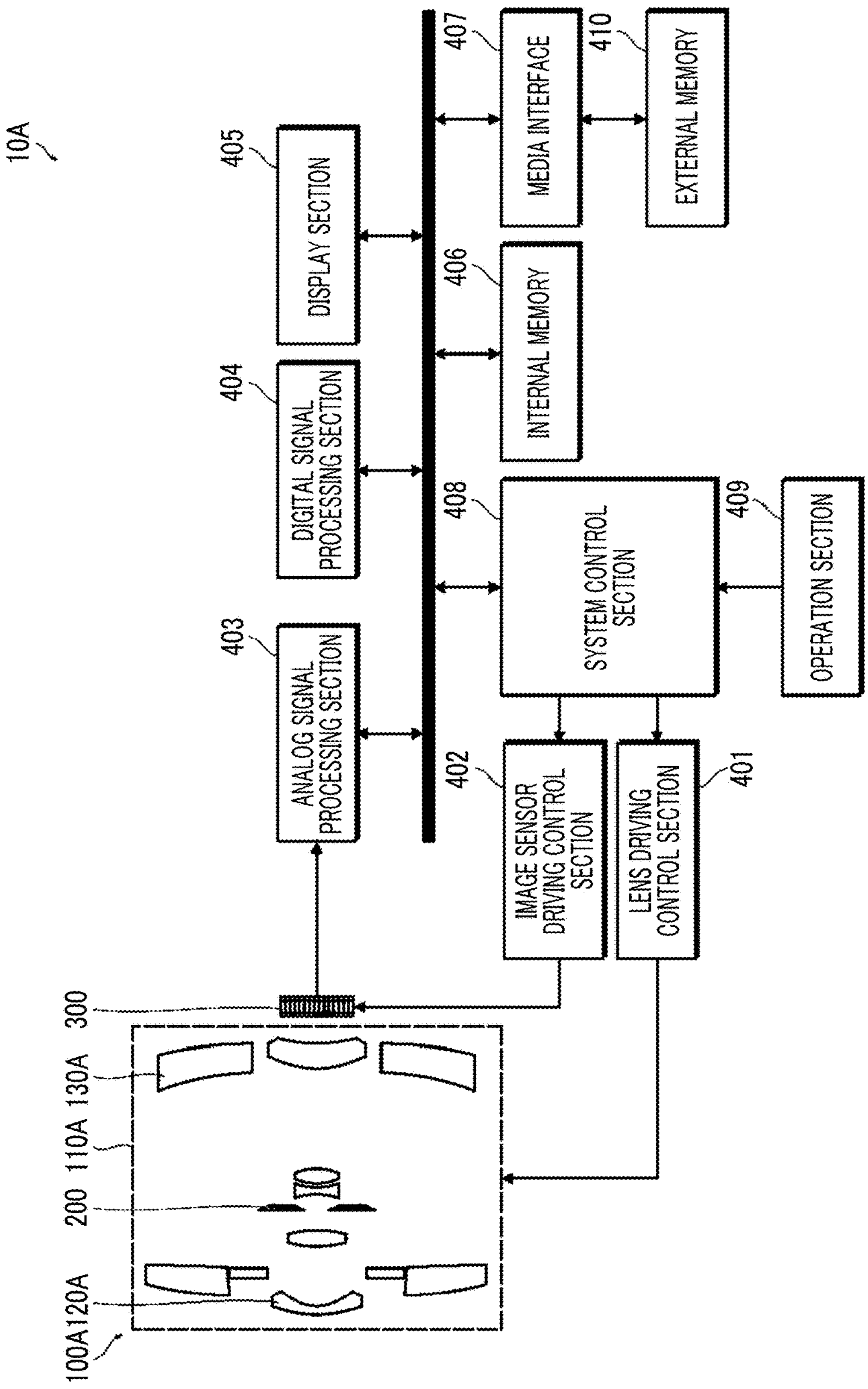
FIG. 13 is a block diagram illustrating a schematic configuration of a second embodiment of an imaging apparatus.

FIG. 13 is a block diagram illustrating a schematic configuration of a second embodiment of an imaging apparatus.

An imaging apparatus 10A of the present embodiment is different from the above-mentioned imaging apparatus 10 of the first embodiment in terms of the configuration of the lens device 100A. Accordingly, only the lens device 100A will be described herein.

[Configuration of Lens Device]

Figure 14:
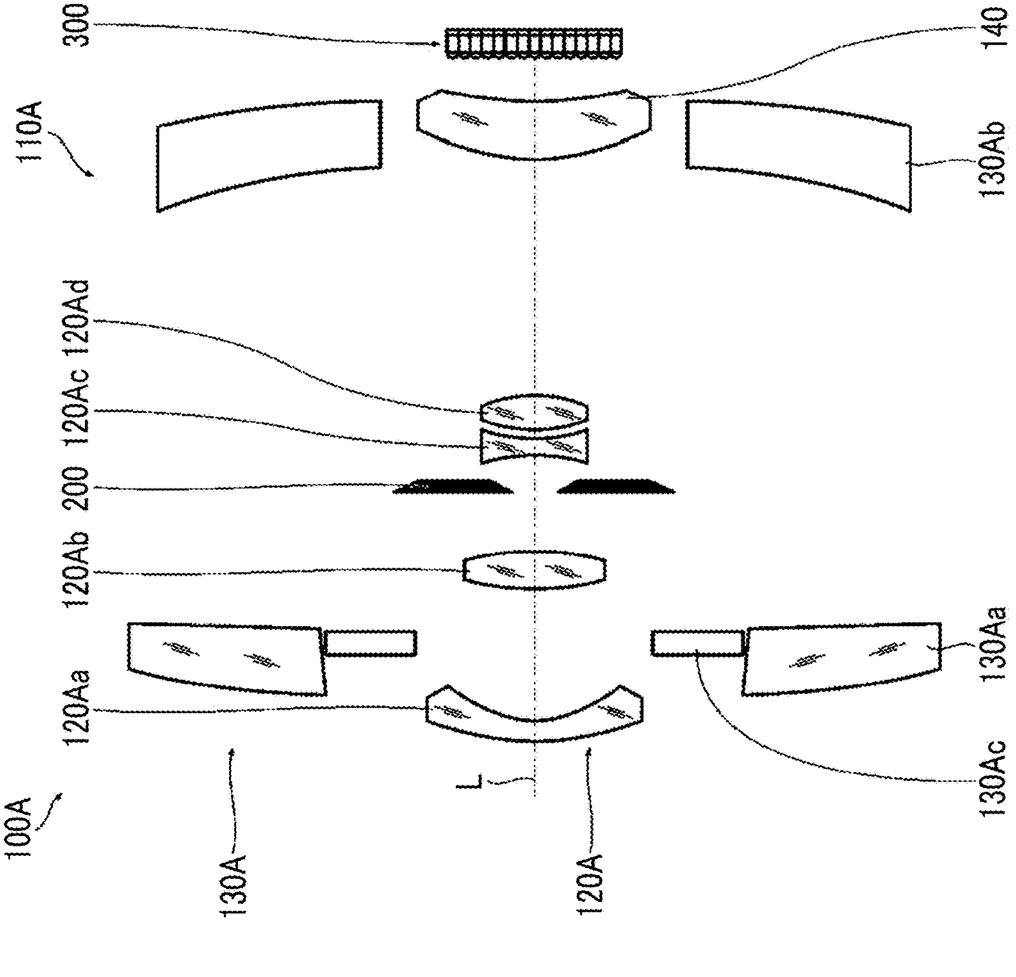
FIG. 14 is a schematic configuration diagram of a lens device.

FIG. 14 is a schematic configuration diagram of a lens device.

In the lens device 100A, a first optical system 120A and a second optical system 130A composing an imaging optical system 110A are composed of optical systems having focal lengths different from each other. The imaging optical system 110A is configured to comprise the first optical system 120A and the second optical system 130A having focal lengths different from each other and a common lens 140 commonly used in the first optical system 120A and the second optical system 130A. The lens device 100A is configured to comprise the imaging optical system 110A and the stop 200.

<<First Optical System>>

The first optical system 120A is composed by combining a plurality of lenses. The wide-angle lens group composing the first optical system 120A is composed of a first wide-angle lens 120Aa, a second wide-angle lens 120Ab, a third wide-angle lens 120Ac, and a fourth wide-angle lens 120Ad.

The first wide-angle lens 120Aa, the second wide-angle lens 120Ab, the third wide-angle lens 120Ac, and the fourth wide-angle lens 120Ad are arranged in order of the first wide-angle lens 120Aa, the second wide-angle lens 120Ab, the third wide-angle lens 120Ac, and the fourth wide-angle lens 120Ad from the subject side, and are arranged along the optical axis L, respectively.

Figure 15:
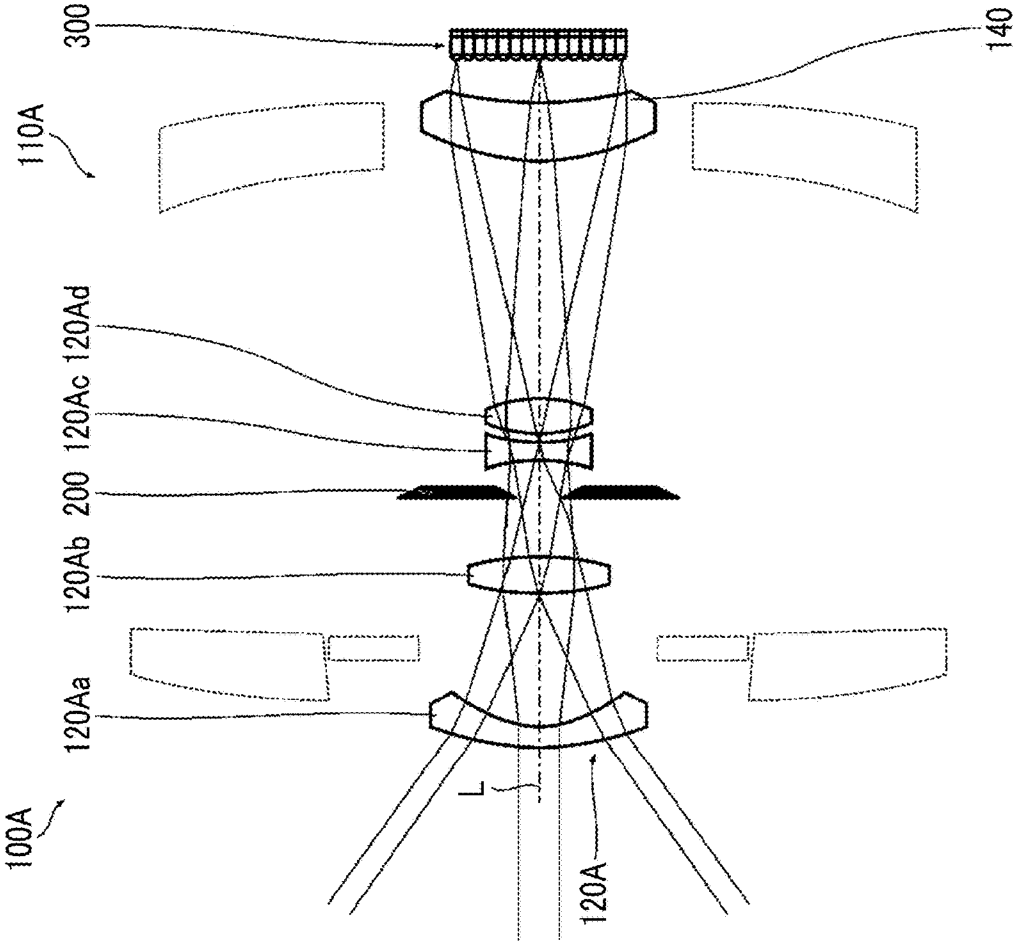
FIG. 15 is a view illustrating ray trajectories of light passing through a first optical system.

FIG. 15 is a view illustrating ray trajectories of light passing through a first optical system. As shown in the drawing, the light incident on the first optical system 120A passes through the first wide-angle lens 120Aa, the second wide-angle lens 120Ab, the third wide-angle lens 120Ac, and the fourth wide-angle lens 120Ad in this order, and is incident on the common lens 140.

<<Second Optical System>>

The second optical system 130A is disposed concentrically with the first optical system 120A. Consequently, the optical axis thereof is commonly used in the first optical system 120A.

The second optical system 130A is composed of a so-called reflection telephoto type optical system, and is composed by combining an annular lens and an annular mirror. The telephoto lens group composing the second optical system 130A is composed of a first telephoto lens 130Aa, a first telephoto minor 130Ab, and a second telephoto mirror 130Ac. The first telephoto lens 130Aa, the first telephoto mirror or 130Ab, and the second telephoto mirror 130Ac are arranged along the ray trajectories from the subject side to the image sensor 300 in order of the first telephoto lens 130Aa, the first telephoto mirror 130Ab, and the second telephoto minor 130Ac, and are arranged along the optical axis L, respectively.

Figure 16:
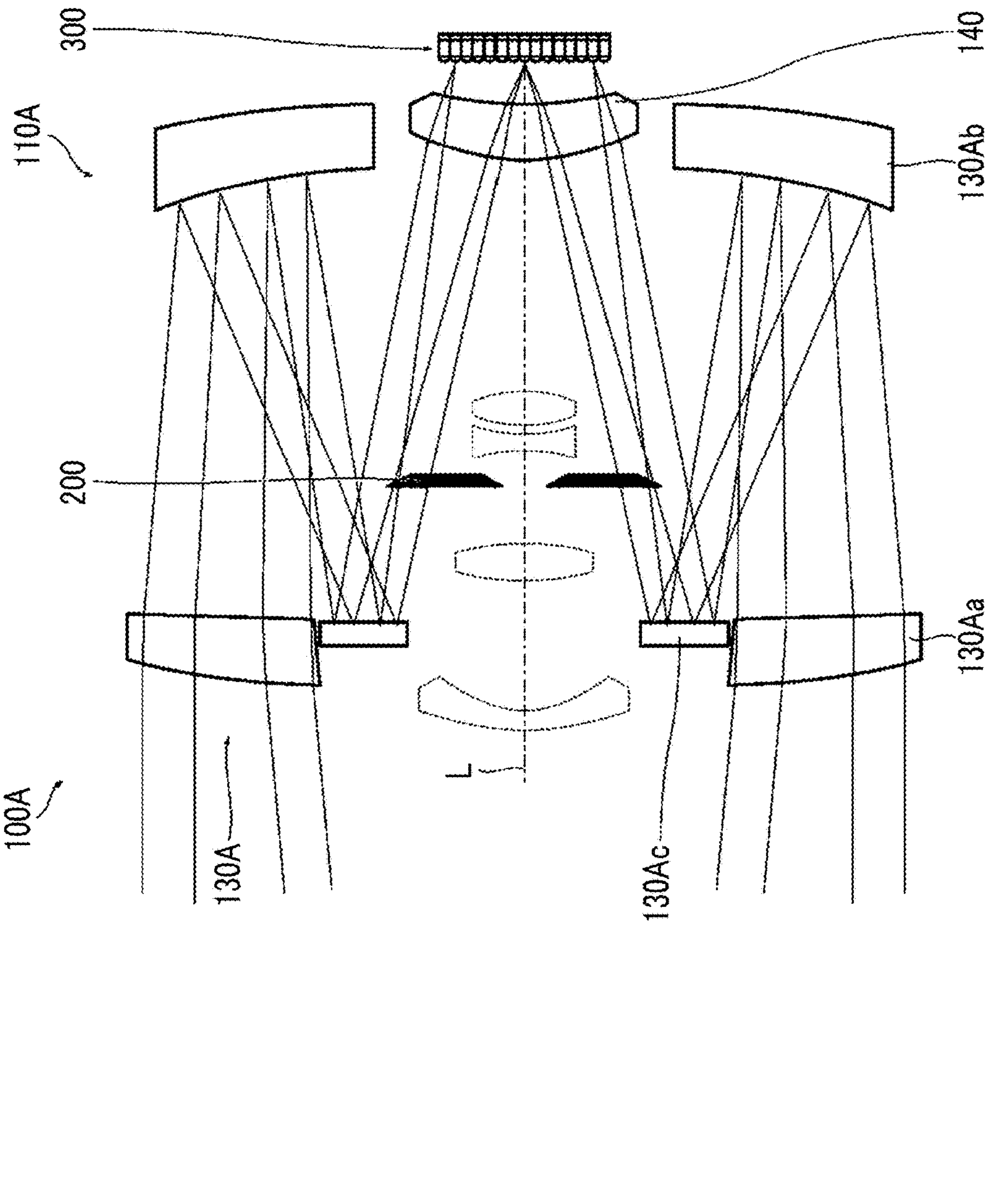
FIG. 16 is a view illustrating ray trajectories of light passing through a second optical system.

FIG. 16 is a view illustrating ray trajectories of light passing through the second optical system. As shown in the drawing, the light incident on the second optical system 130A is transmitted through the first telephoto lens 130Aa, is reflected by the first telephoto mirror 130Ab, is further reflected by the second telephoto mirror 130Ac, and is incident on the common lens 140.

<<Common Lens>>

The common lens 140 is a lens commonly used in the first optical system 120A and the second optical system 130A, and is disposed to remain stationary at a certain position on the optical axis L. The common lens 140 adjusts the incident angle of light incident on the image sensor 300. The light, which passes through the first optical system 120A and the second optical system 130A, is incident on the image sensor 300 through the common lens 140.

<<Stop>>

A stop 200 is configured to be the same as the stop 200 of the above-mentioned embodiment. That is, the light blocking section 208 capable of increasing or decreasing the inner diameter and the outer diameter is provided, and the inner diameter and the outer diameter of the light blocking section are increased or decreased to adjust the light amount of light passing through the first optical system 120A and the second optical system 130A.

The stop 200 is disposed between the second wide-angle lens 120Ab and the third wide-angle lens 120Ac composing the first optical system 120A, and the boundary between the pupil regions of the first optical system 120A and the second optical system 130A is blocked by the light blocking section 208. In a case where the aperture of the stop 200 is reduced, the light blocking region expands so as to enlarge the boundary between the pupil regions of the first optical system 120A and the second optical system 130A, and the light amount of light passing through the first optical system 120A and the second optical system 130A are reduced.

It should be noted that this stop 200 may be composed of liquid crystal elements.

[Operation of Lens Device]

According to the lens device 100A of the present embodiment configured as described above, since the first optical system 120A and the second optical system 130A are composed of optical systems having different focal lengths, it is possible to capture images at different focal lengths simultaneously. Particularly, according to the lens device 100A of the present embodiment, the first optical system 120A is composed of a wide-angle optical system having a short focal length, and the second optical system 130A is composed of a telephoto optical system having a long focal length. Therefore, it is possible to capture wide-angle and telephoto images at once.

[Modification Example of Imaging Apparatus of Second Embodiment]

<<Modification Example of Lens Device>>

<Configuration of Modification Example of Lens Device>

Figure 17:
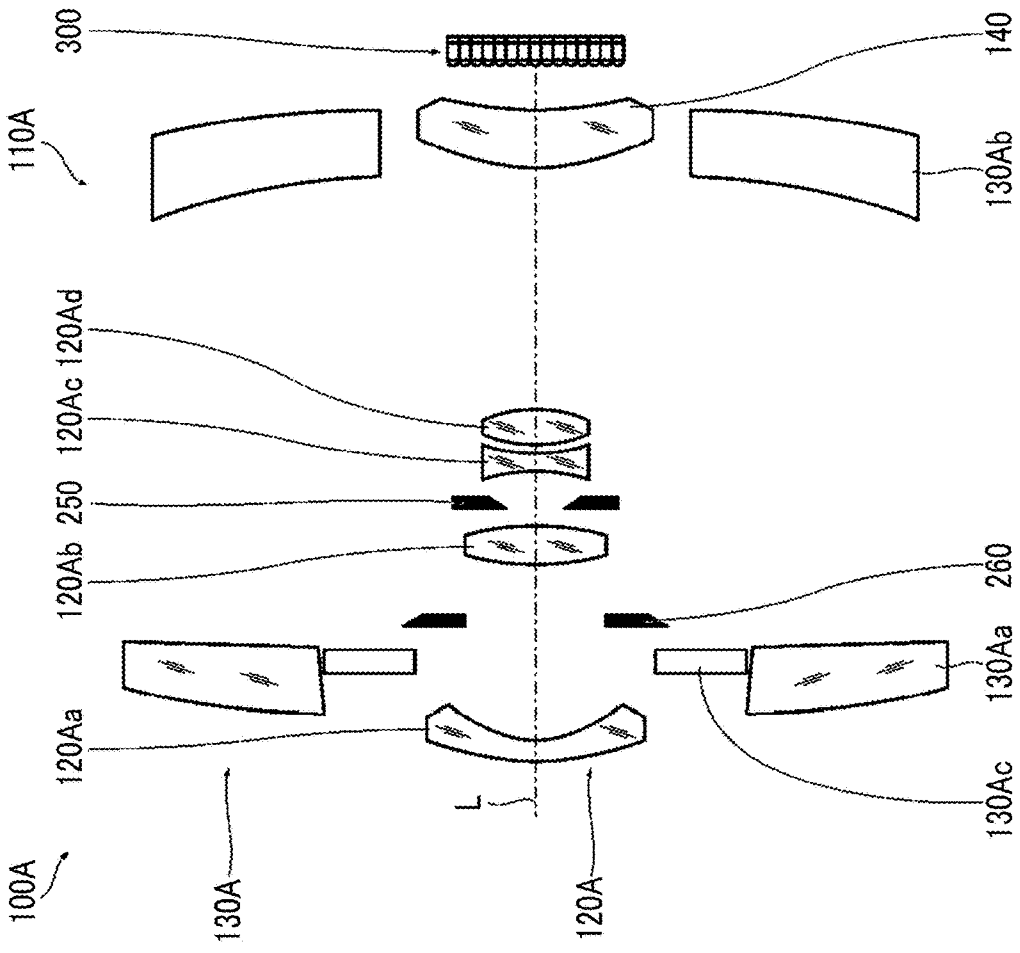
FIG. 17 is a schematic configuration diagram of a modification example of the lens device.
Figure 18:
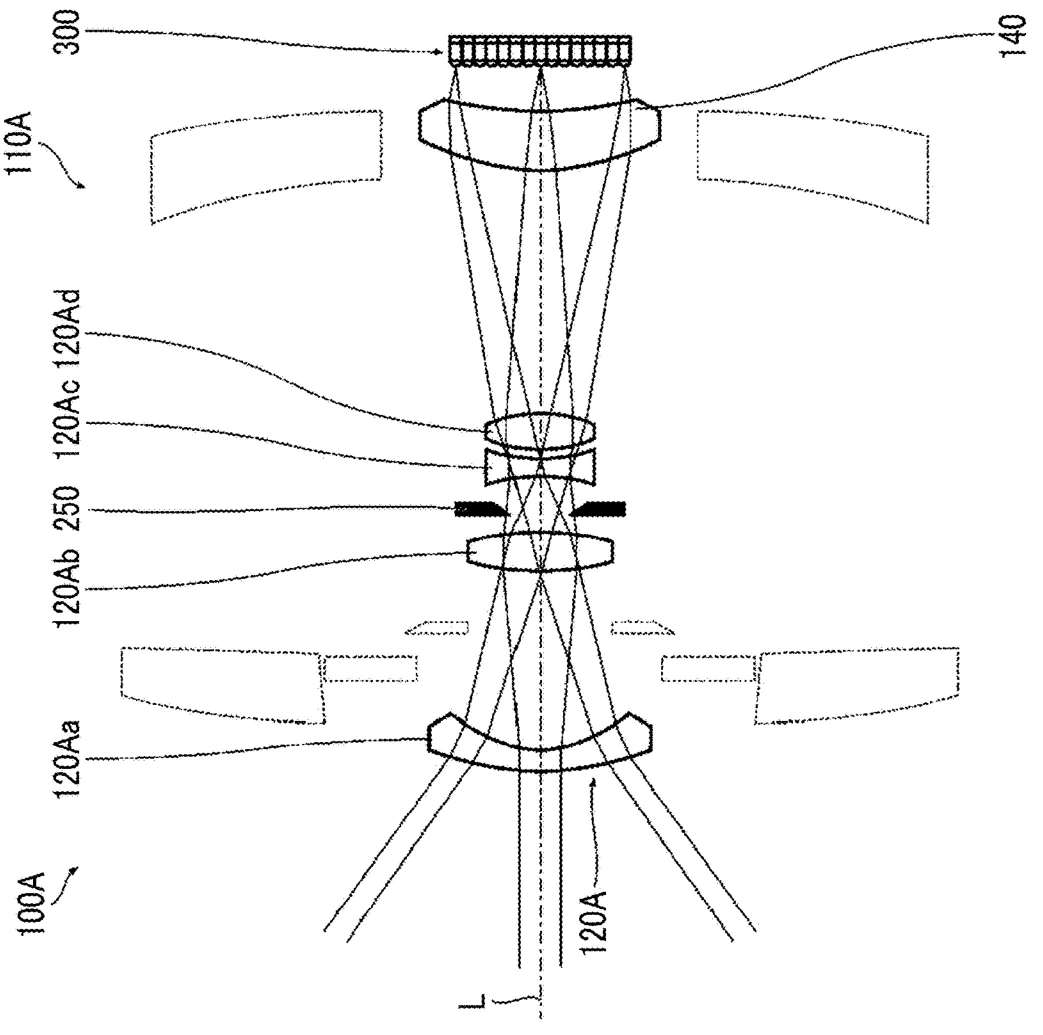
FIG. 18 is a view illustrating ray trajectories of light passing through a first optical system.
Figure 19:
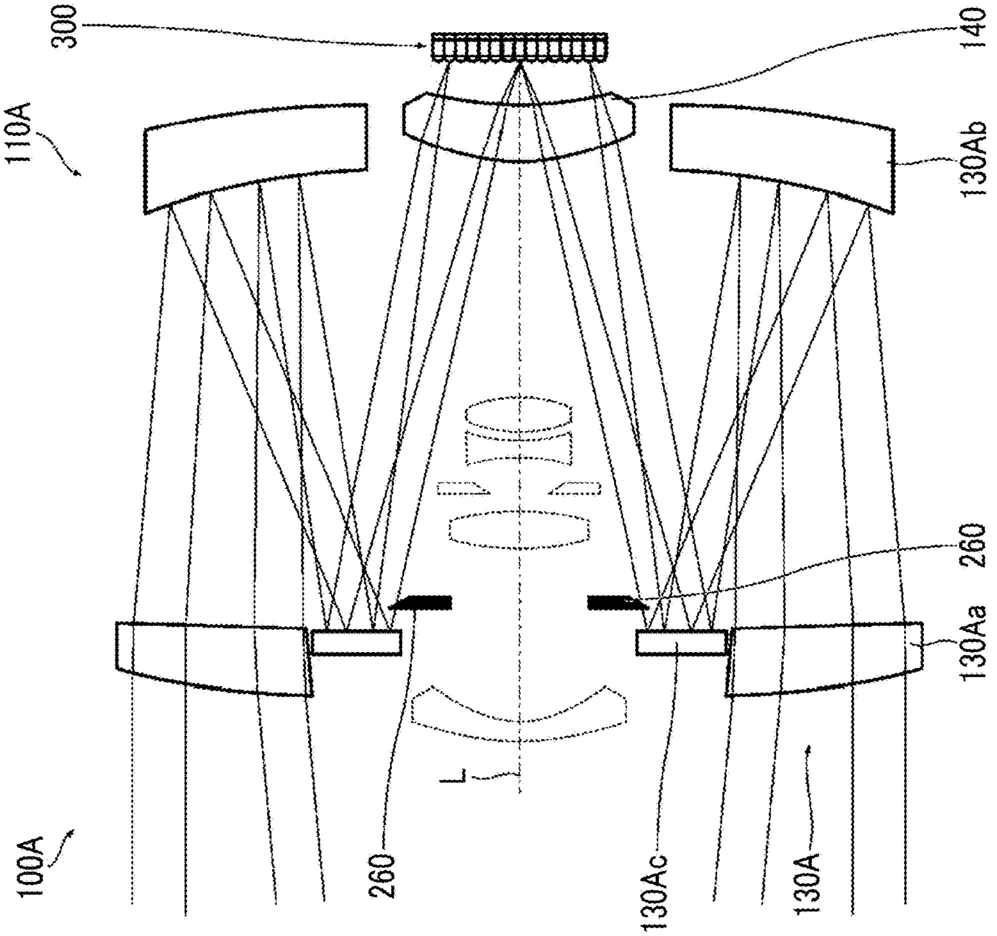
FIG. 19 is a view illustrating ray trajectories of light passing through a second optical system.

FIG. 17 is a schematic configuration diagram of a modification example of the lens device. Further, FIG. 18 is a view illustrating ray trajectories of light passing through the first optical system, and FIG. 19 is a view illustrating ray trajectories of light passing through the second optical system.

As shown in FIG. 17, the lens device 100A of the present example comprises a stop for each optical system. The first optical system 120A comprises a first stop 250, and the second optical system 130A comprises a second stop 260. As shown in FIG. 18, the first stop 250 adjusts the light amount of light passing through the first optical system 120A. As shown in FIG. 19, the second stop 260 adjusts the light amount of light passing through the second optical system 130A. Hereinafter, the configuration of each stop will be described.

[First Stop]

The first stop 250 adjusts the light amount of light passing through the first optical system 120A. The first stop 250 is disposed on the optical axis L and is disposed between the second wide-angle lens 120Ab and the third wide-angle lens 120Ac composing the first optical system 120A.

Figure 20:
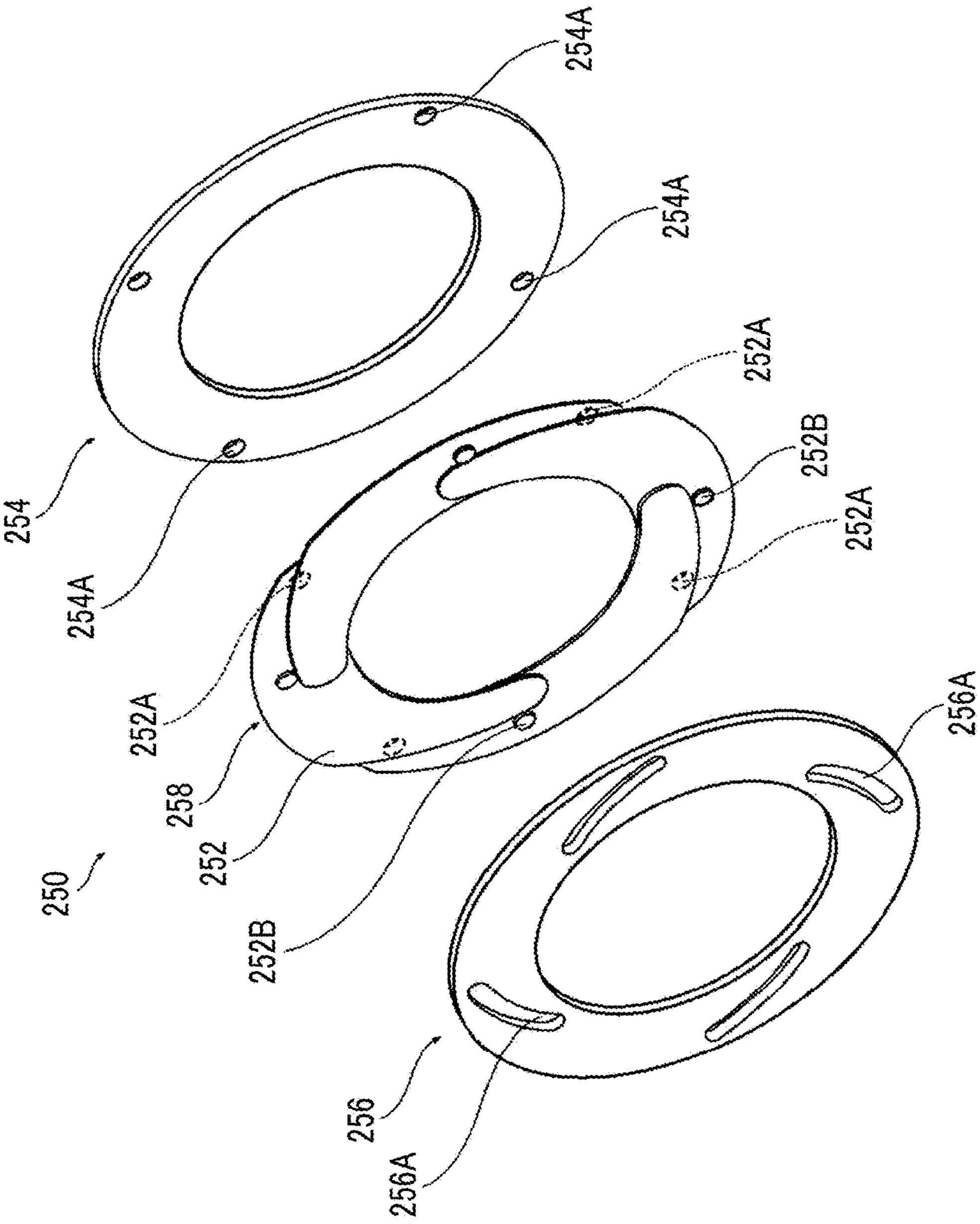
FIG. 20 is an exploded perspective view of the first stop.
Figure 21:
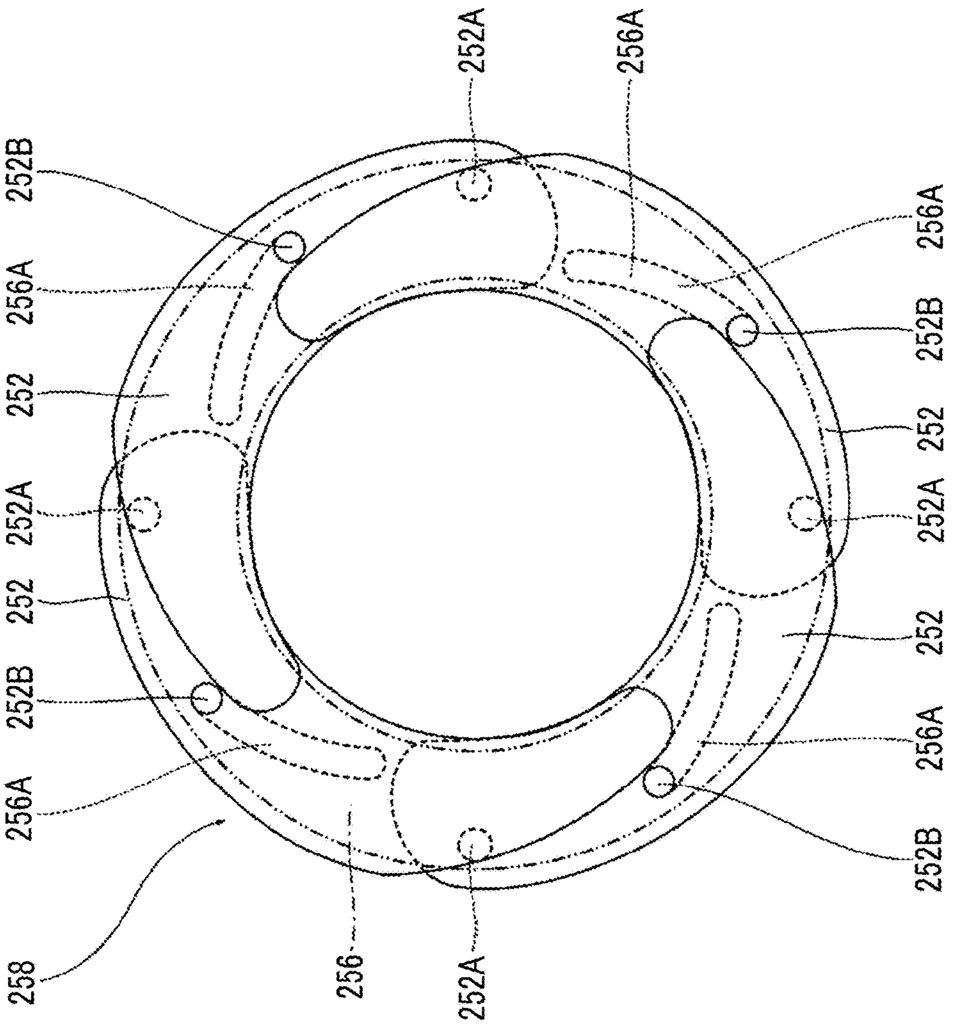
FIG. 21 is a front view illustrating a configuration of arrangement of first stop blades.

FIG. 20 is an exploded perspective view of the first stop. Further, FIG. 21 is a front view illustrating a configuration of arrangement of the first stop blades.

The first stop 250 is configured to mainly comprises a plurality of first stop blades 252, a first stop blade supporting member 254 that swingably supports the plurality of first stop blades 252, a first stop blade driving member 256 that swings the plurality of first stop blades 252 synchronously, and a first actuator (not shown in the drawing) that operates the first stop blade driving member 256.

The plurality of first stop blades 252 all has the same shape. The respective first stop blades 252 are arranged with regular intervals on the same circumference, and are arranged the adjacent first stop blades 252 are arranged to overlap each other. As shown in FIG. 21, the first stop blades 252 arranged in this manner form a first light blocking section 258, which has an annular shape, as a whole. FIG. 21 shows a state in which the first stop 250 is released, that is, a state in which the first stop 250 is fully opened. In this case, the inner diameter of the first light blocking section 258, which has an annular shape, is the maximum.

As shown in FIG. 20, the first stop blade supporting member 254 is composed of an annular plate material. The first stop blade supporting member 254 is disposed coaxially with the first light blocking section 258 which has an annular shape. The first stop blade supporting member 254 comprises a plurality of bearing holes 254A. The bearing holes 254A are arranged with regular intervals on the same circumference. Each bearing hole 254A composes a first fulcrum.

Each of the first stop blades 252 comprises a first swing shaft 252A that can be fitted into the bearing hole 254A. Each of the first stop blades 252 is swingably supported on the first stop blade supporting member 254 by fitting the first swing shaft 252A in the bearing hole 254A.

As shown in FIG. 20, the first stop blade driving member 256 is composed of an annular plate material. The first stop blade driving member 256 is disposed coaxially with the first light blocking section 258 and supported by a supporting member, which is not shown, so as to be swingable in the circumferential direction. The first stop blades 252 are arranged to be sandwiched between the first stop blade driving member 256 and the first stop blade supporting member 254.

The first stop blade driving member 256 comprises a plurality of first cam grooves 256A. The plurality of first cam grooves 256A all has the same shape, and is disposed at regular intervals on the same circumference.

Each of the first stop blades 252 comprises a first cam pin 252B. The first cam pin 252B is fitted into each of the first cam grooves 256A. In a case where the first cam pin 252B is fitted into the first cam groove 256A, the first stop blade driving member 256 is swung, and then the first stop blades 252 swing in conjunction with the motion of the first stop blade driving member 256.

The first cam pins 252B, the first cam grooves 256A, and the first stop blade driving member 256 compose a first stop blade driving section for synchronously swinging the first stop blades 252.

The first actuator, which is not shown, is composed of, for example, a motor, and swings the first stop blade driving member 256 in the circumferential direction. For example, the first actuator swings the first stop blade driving member 256 step by step in accordance with a preset aperture value. Thereby, the inner diameter of the first light blocking section 258 is increased or decreased in accordance with the aperture value.

The first stop 250 is configured as described above.

Figure 22:
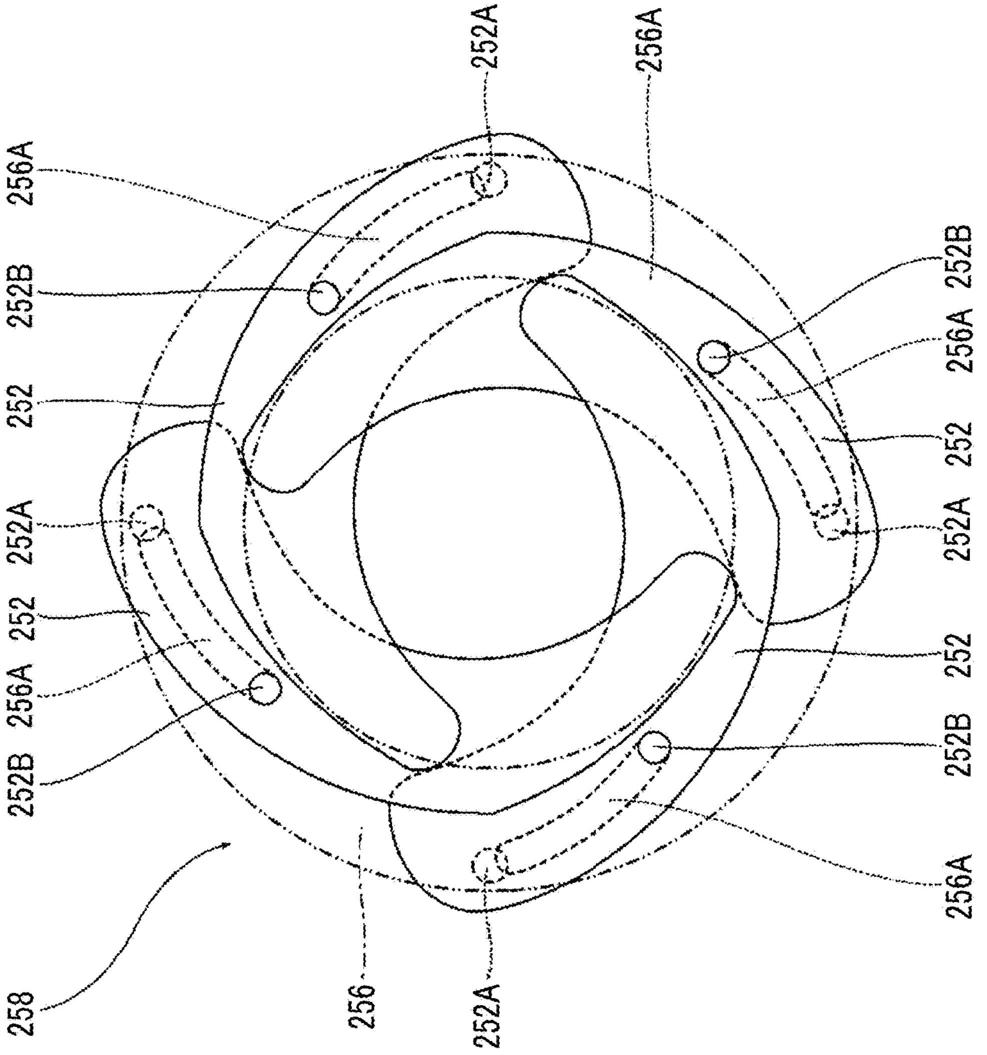
FIG. 22 is an explanatory diagram of the operation of a first stop.

FIG. 22 is an explanatory diagram of the operation of the first stop.

In a case where the first stop blade driving member 256 is swung, all the first stop blades 252 swing synchronously around the bearing hole 254A as the first fulcrum by the action of the first cam grooves 256A and the first cam pins 252B. As a result, the inner diameter of the first light blocking section 258 composed of the first stop blades 252 is increased or decreased.

As described above, the first stop 250 is disposed between the second wide-angle lens 120Ab and the third wide-angle lens 120Ac. As shown in FIG. 18, The light incident on the first optical system 120A passes through the inside of the first stop 250 and is incident on the image sensor 300. More specifically, the light incident on the first optical system 120A passes through the inside of the first light blocking section 258 composed of the first stop blades 252 and is incident on the image sensor 300. In the first stop 250, in a case where the first stop blade 252 is swung, the inner diameter of the first light blocking section 258 is increased or decreased. Therefore, by increasing and decreasing the inner diameter of the first light blocking section 258, it is possible to adjust the light amount of the light passing through the first optical system 120A.

[Second Stop]

The second stop 260 adjusts the light amount of light passing through the second optical system 130A. The second stop 260 is disposed on the optical axis L and is disposed immediately behind the second telephoto mirror 130Ac composing the second optical system 130A.

Figure 23:
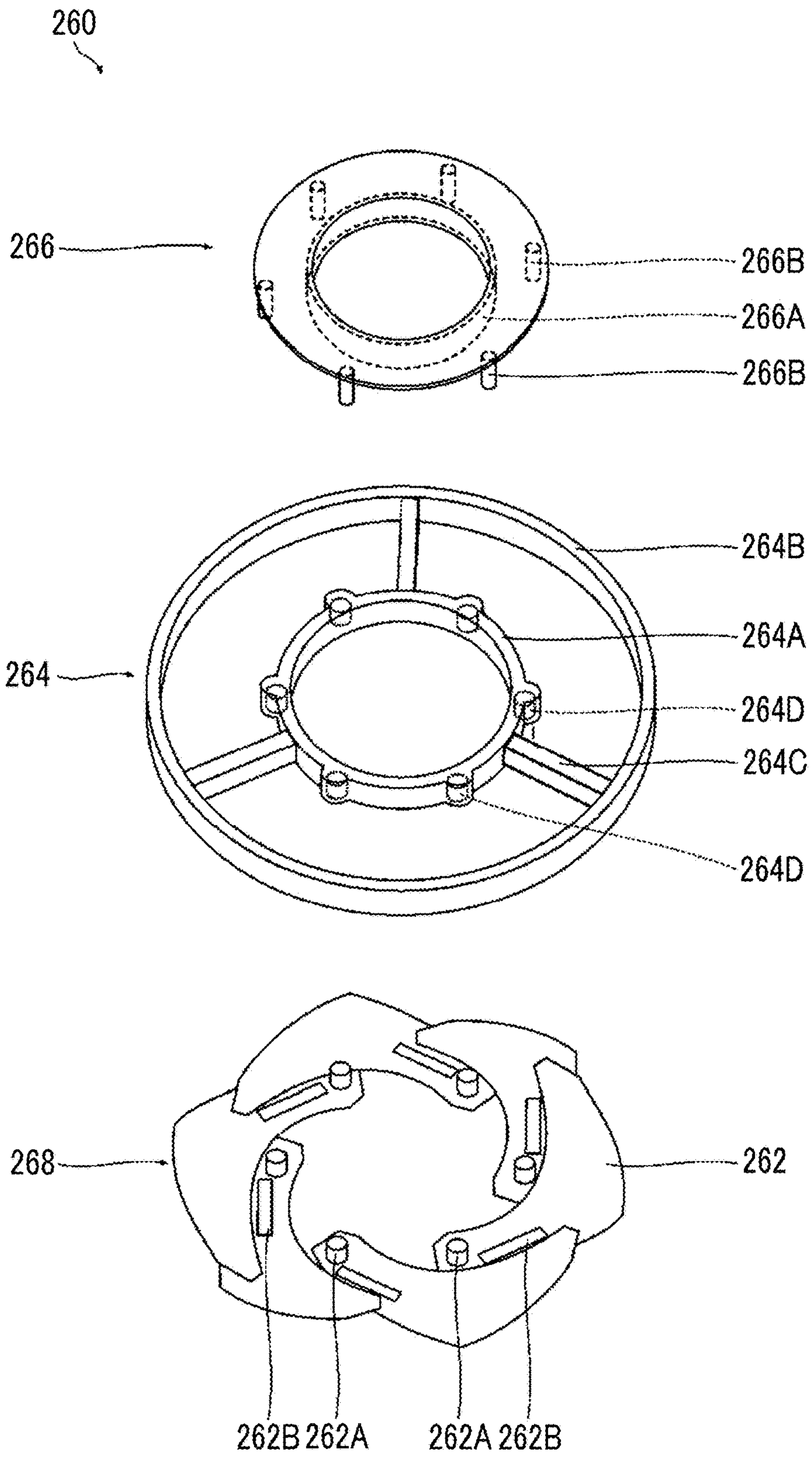
FIG. 23 is an exploded perspective view of a second stop.

FIG. 23 is an exploded perspective view of the second stop. Further, FIG. 24 is a front view of the second stop blade composing the second stop, and FIG. 25 is a front view illustrating a configuration of arrangement of the second stop blades.

As shown in FIG. 23, the second stop 260 is configured to mainly comprise a plurality of second stop blades 262, a second stop blade supporting member 264 that swingably supports the plurality of second stop blades 262, a second stop blade driving member 266 that swings the plurality of second stop blades 262 synchronously, and a second actuator (not shown in the drawing) that operates the second stop blade driving member 266.

Figure 24:
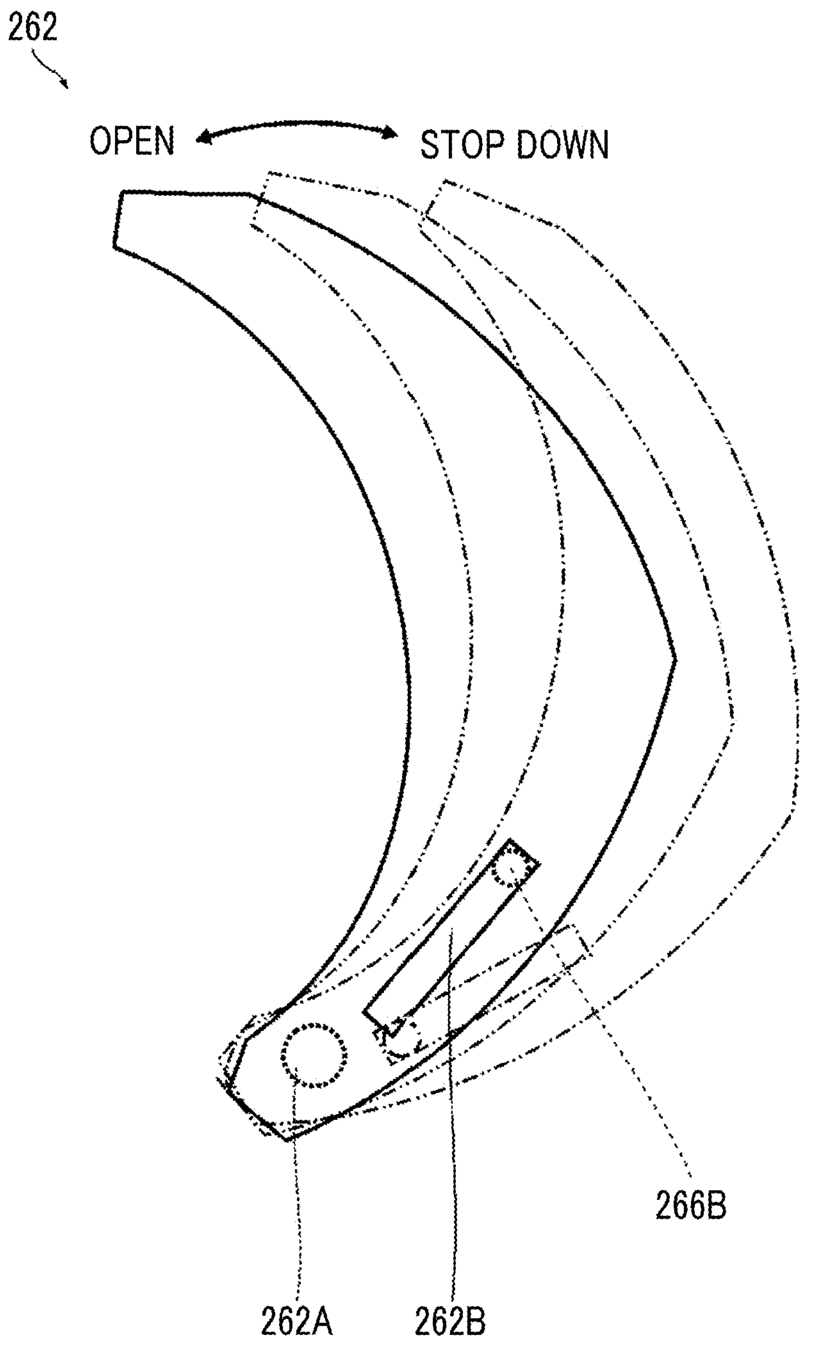
FIG. 24 is a front view of second stop blades composing the second stop.
Figure 25:
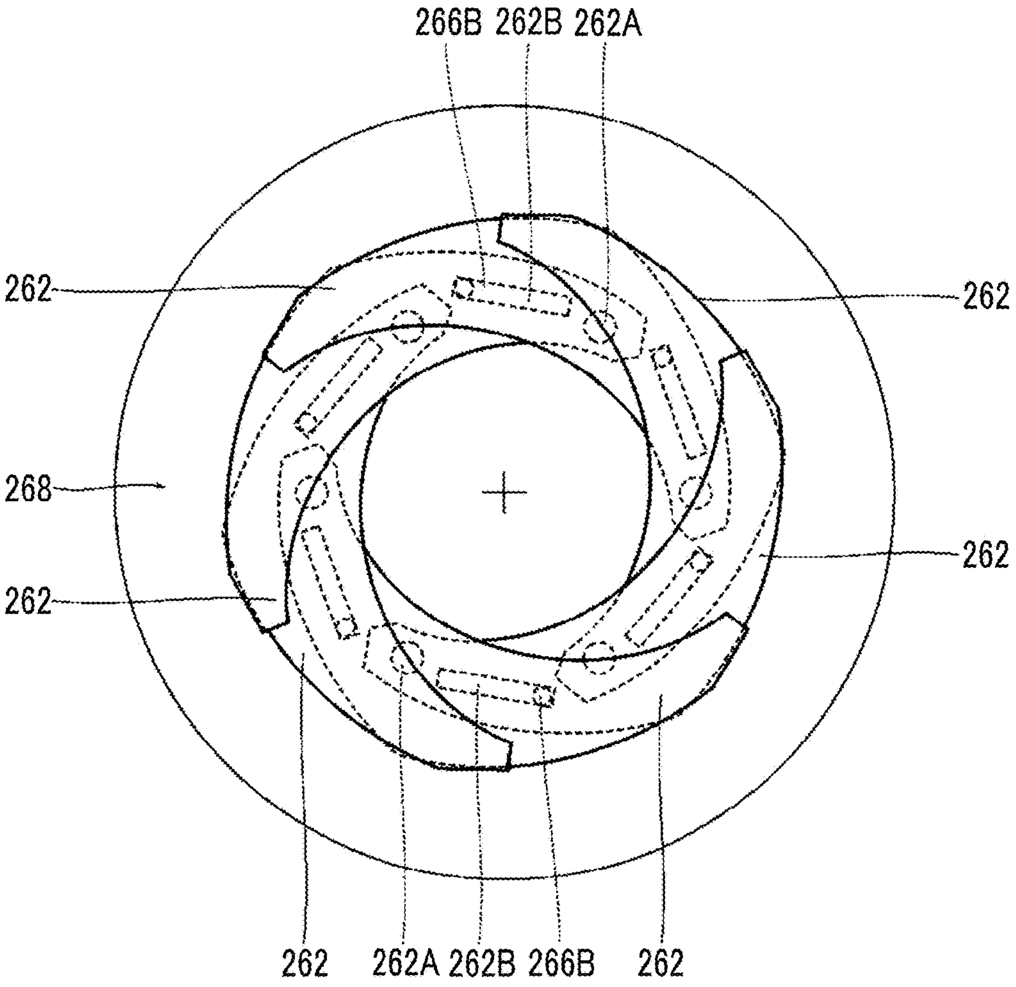
FIG. 25 is a front view illustrating a configuration of arrangement of second stop blades.

The second stop blades 262 all have the same shape, and have an arcuate shape as shown in FIG. 24. As shown in FIG. 25, the second stop blades 262 are respectively arranged with regular intervals on the same circumference, and the second stop blades 262 adjacent to each other are arranged to overlap with each other. The second stop blades 262 arranged in such a manner form the second light blocking section 268 having an annular shape as a whole. FIG. 25 shows a state in which the second stop 260 is released, that is, a state in which the second stop 260 is fully opened. In this case, the outer diameter of the second light blocking section 268 is minimized.

The second stop blade supporting member 264 is disposed coaxially with the second light blocking section 268. As shown in FIG. 23, the second stop blade supporting member 264 is configured to comprise an inner frame 264A, an outer frame 264B, three support arms 264C, and bearings 264D. Both the inner frame 264A and the outer frame 264B are composed of annular frames, and are arranged concentrically. The three support arms 264C are arranged radially, and connect the inner frame 264A and the outer frame 264B to each other. The bearings 264D are provided in the inner frame 264A, and are arranged with regular intervals in the circumferential direction. Each bearing 264D composes a second fulcrum.

Each second swing shaft 62A, which can be fitted into the bearing 264D, is provided at the base end section of each second stop blade 262. Each second stop blade 262 is swingably supported by the second stop blade supporting member 264 by fitting the second swing shaft 62A into the bearing 264D.

The second stop blade driving member 266 is disposed coaxially with the second light blocking section 268. As shown in FIG. 23, the second stop blade driving member 266 is composed of an annular plate material, and comprises a fitting portion 266A having an annular shape at the inner peripheral portion thereof. By fitting the fitting portion 266A into the inner peripheral portion of the second stop blade supporting member 264, the second stop blade driving member 266 is disposed coaxially with the second stop blade supporting member 264 and the second light blocking section 268, and is supported swingably in the circumferential direction.

The second stop blade driving member 266 comprises a plurality of second cam pins 266B. The second cam pins 266B are arranged with regular intervals on the same circumference.

Each of the second stop blades 262 comprises a second cam groove 262B. The second cam pin 266B is fitted into each of the second cam grooves 262B. In a case where the second cam pin 266B is fitted into each of the second cam grooves 262B, the second stop blade driving member 266 is swung, and then the second stop blades 262 swing in conjunction with the motion of the second stop blade driving member 266.

The second cam grooves 262B, the second cam pins 266B, and the second stop blade driving member 266 compose a second stop blade driving section for synchronously swinging the second stop blades 262.

The second actuator, which is not shown, is composed of, for example, a motor, and swings the second stop blade driving member 266 in the circumferential direction. For example, the second actuator swings the second stop blade driving member 266 step by step in accordance with a preset aperture value. Thereby, the outer diameter of the second light blocking section 268 is increased or decreased in accordance with the aperture value.

Figure 26:
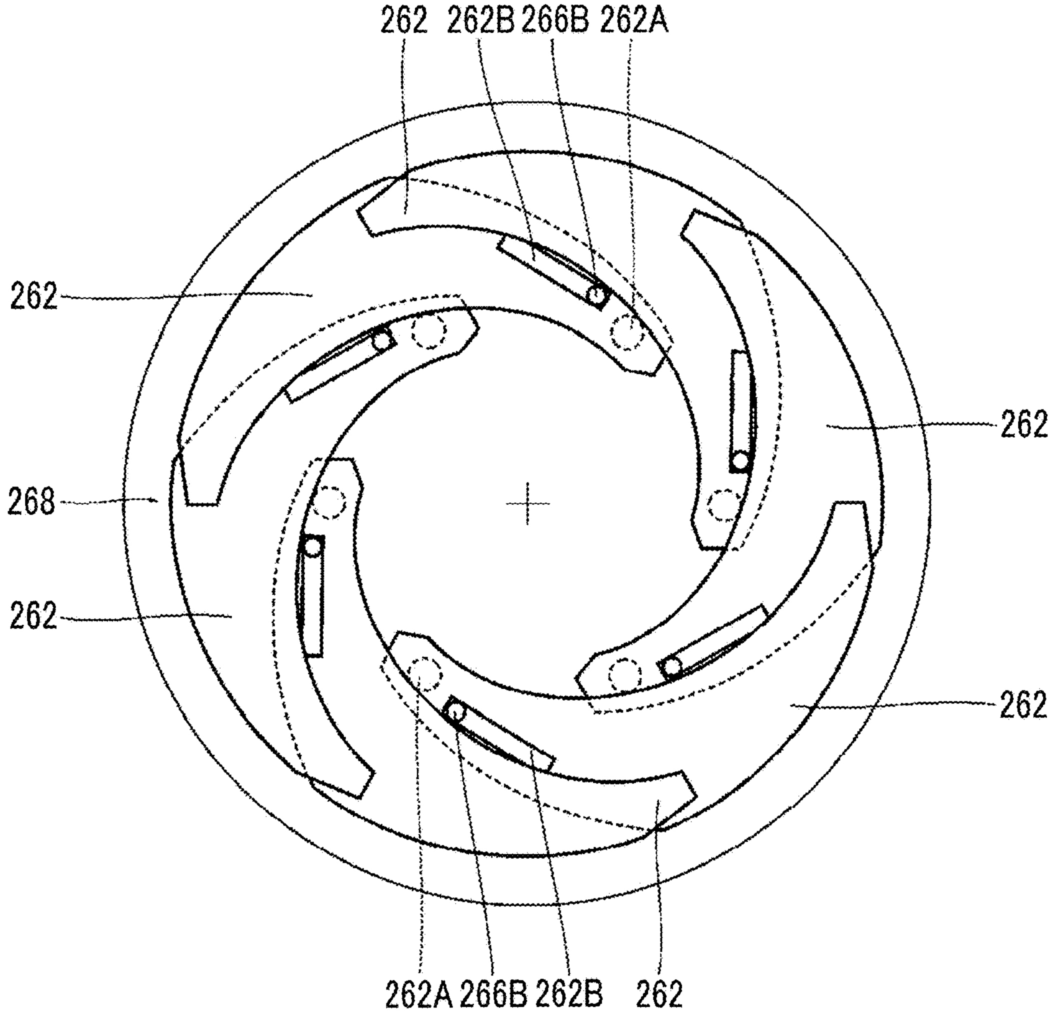
FIG. 26 is an explanatory diagram of the operation of the second stop.

FIG. 26 is an explanatory diagram of the operation of the second stop.

In a case where the second stop blade driving member 266 is swung, all the second stop blades 262 swing synchronously around the bearing 264D as the second fulcrum by the action of the second cam pins 266B and the second cam grooves 262B. As a result, the outer diameter of the second light blocking section 268 composed of the second stop blades 262 is increased or decreased.

As described above, the second stop 260 is disposed immediately behind the second telephoto mirror 130Ac. As shown in FIG. 19, The light incident on the second optical system 130A passes through the outside of the second stop 260 and is incident on the image sensor 300. More specifically, the light passes through the outside of the second light blocking section 268 composed of the second stop blade 262 and is incident on the image sensor 300. In the second stop 260, in a case where the second stop blade 262 is swung, the outer diameter of the second light blocking section 268 is increased or decreased. Therefore, by increasing and decreasing the outer diameter of the second light blocking section 268, it is possible to adjust the light amount of the light passing through the second optical system 130A.

<Operation of Modification Example 1 of Lens Device>

According to the lens device 100A configured as described above, the light amount of light passing through the first optical system 120A is adjusted by the first stop 250, and the light amount of light passing through the second optical system 130A is adjusted by the second stop 260.

At this time, by reducing the aperture of the first stop 250, the inner diameter of the first light blocking section 258 is reduced, and the light passing through the first optical system 120A are reduced. On the other hand, by reducing the aperture of the second stop 260, the outer diameter of the second light blocking section 268 is increased, and the light passing through the first optical system 120A are reduced.

By decreasing the inner diameter of the first light blocking section 258, the light blocking region expands so as to enlarge the boundary between the pupil regions of the first optical system 120A and the second optical system 130A. In addition, by increasing the outer diameter of the second light blocking section 268, the light blocking region expands so as to enlarge the boundary between the pupil regions of the first optical system 120A and the second optical system 130A.

As described above, also in the lens device 100A of the present example, in a case where the aperture of the stop is reduced, the light blocking region expands so as to enlarge the boundary between the pupil regions of the first optical system 120A and the second optical system 130A. As a result, it is possible to improve separability of the light incident on the image sensor 300, and it is possible to effectively suppress interference.

In the lens device 100A of the present example, the first light blocking section 258 of the first stop 250 and the second light blocking section 268 of the second stop 260 are combined to compose one light blocking section.

<<Other Examples of First Stop and Second Stop>>

The first stop 250 and the second stop 260 applied to the modification example of the above-mentioned lens device 100A may be composed of liquid crystal elements.

<First Stop Composed of Liquid Crystal Elements>

Figure 27:
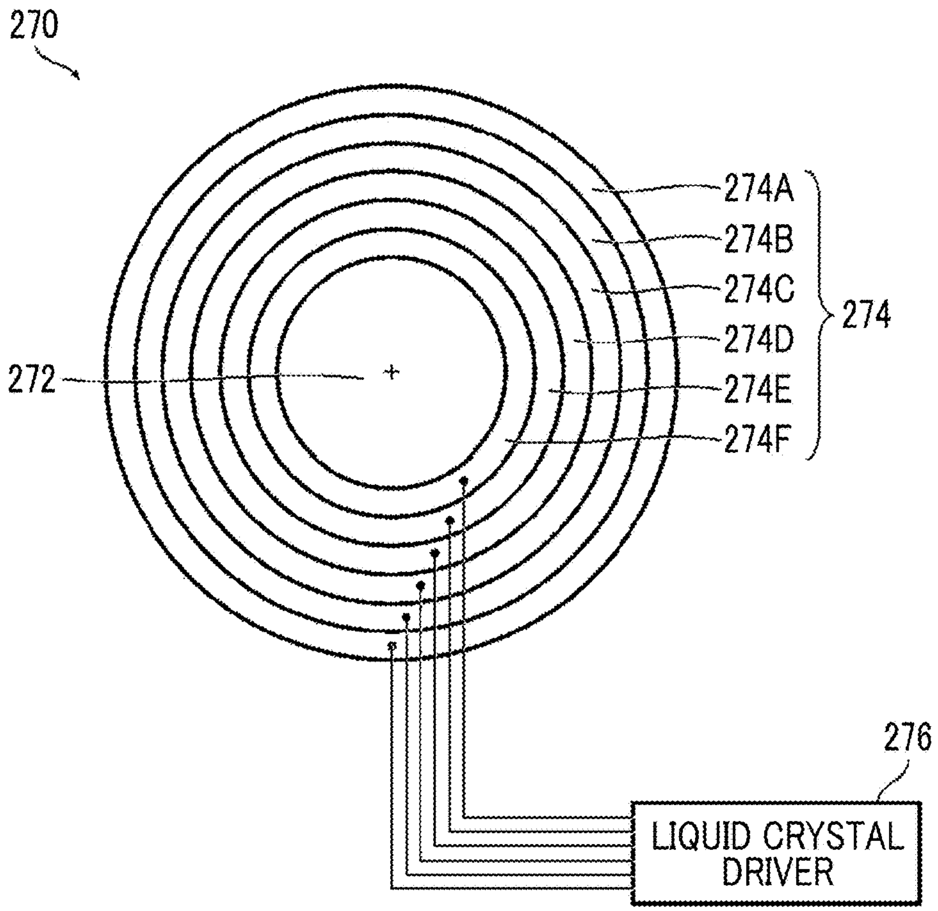
FIG. 27 is a front view illustrating an example of the first stop composed of liquid crystal elements.

FIG. 27 is a front view illustrating an example of the first stop composed of liquid crystal elements.

The first stop 270 of the present example is composed of, for example, liquid crystal elements such as STN liquid crystal, DSTN liquid crystal, or TFT liquid crystal.

The first stop 270 has a discoid shape. The first stop 270 comprises a circular light transmitting region 272 in the central portion, and an annular light transmitting/blocking switch region 274 in the outer peripheral portion.

The light transmitting region 272 is a region which has translucency and through which light is constantly transmitted.

The light transmitting/blocking switch region 274 is a region where it is possible to arbitrarily switch between a light transmitting state in which light is transmitted and a light blocking state in which light is blocked. The light transmitting/blocking switch region 274 composes a first light blocking section in the light blocking state. The light transmitting/blocking switch region 274 is configured such that a plurality of annular regions 274A to 274F is concentrically combined. Each of the annular regions 274A to 274F is configured to be capable of individually switching between the light transmitting state and the light blocking state.

Each of the annular regions 274A to 274F composing the light transmitting/blocking switch region 274 is independently controlled by a liquid crystal driver 276, and is set in the light transmitting state or the light blocking state.

In the first stop 270 configured as described above, the aperture amount is adjusted by individually controlling the states of the respective annular regions 274A to 274F composing the light transmitting/blocking switch region 274.

Figure 28B:
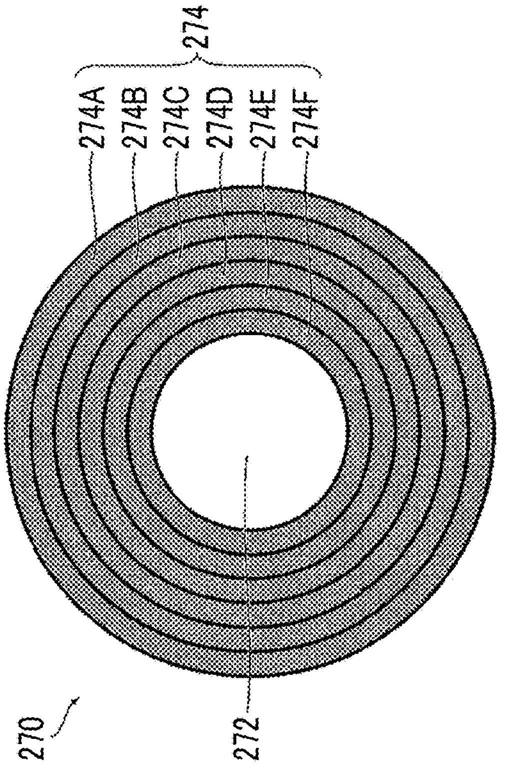
FIGS. 28A and 28B are explanatory diagrams of the operation of the first stop composed of liquid crystal elements.
Figure 28A:
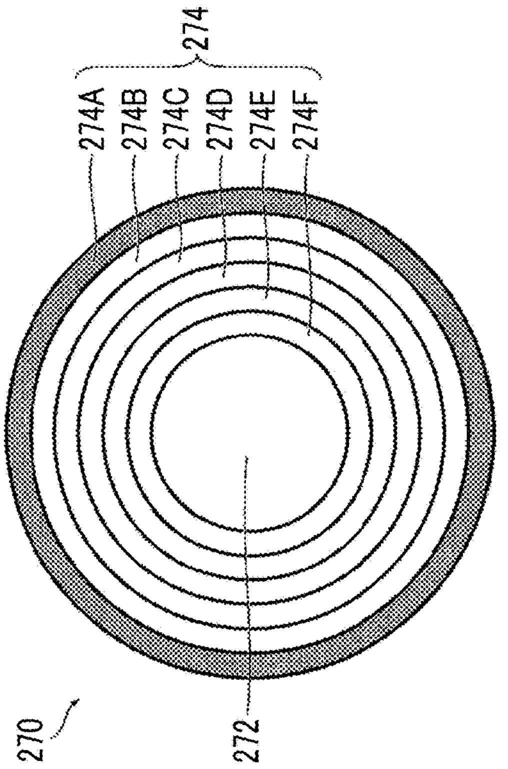

FIGS. 28A and 28B are explanatory diagrams of the operation of the first stop composed of liquid crystal elements. FIG. 28A shows a state in which the aperture of the stop is reduced by one stop, and FIG. 28B shows a state in which the aperture of the stop is minimized.

As shown in FIG. 28A, in a case where the aperture of the stop is reduced by one stop, the annular region 274A positioned to be closest to the outside of the light transmitting/blocking switch region 274 is set in the light blocking state, and the other annular regions 274B to 274F are set in the light transmitting state.

As shown in FIG. 28B, in a case where the aperture of the stop is minimized, all the annular regions 274A to 274F composing the light transmitting/blocking switch region 274 are in the light blocking state.

In this manner, in a case where the aperture of the first stop 270 is reduced, the annular regions 274A to 274F composing the light transmitting/blocking switch region 274 are blocked from light in order from the outside. As a result, the light blocking region expands inward.

<Second Stop Composed of Liquid Crystal Elements>

Figure 29:
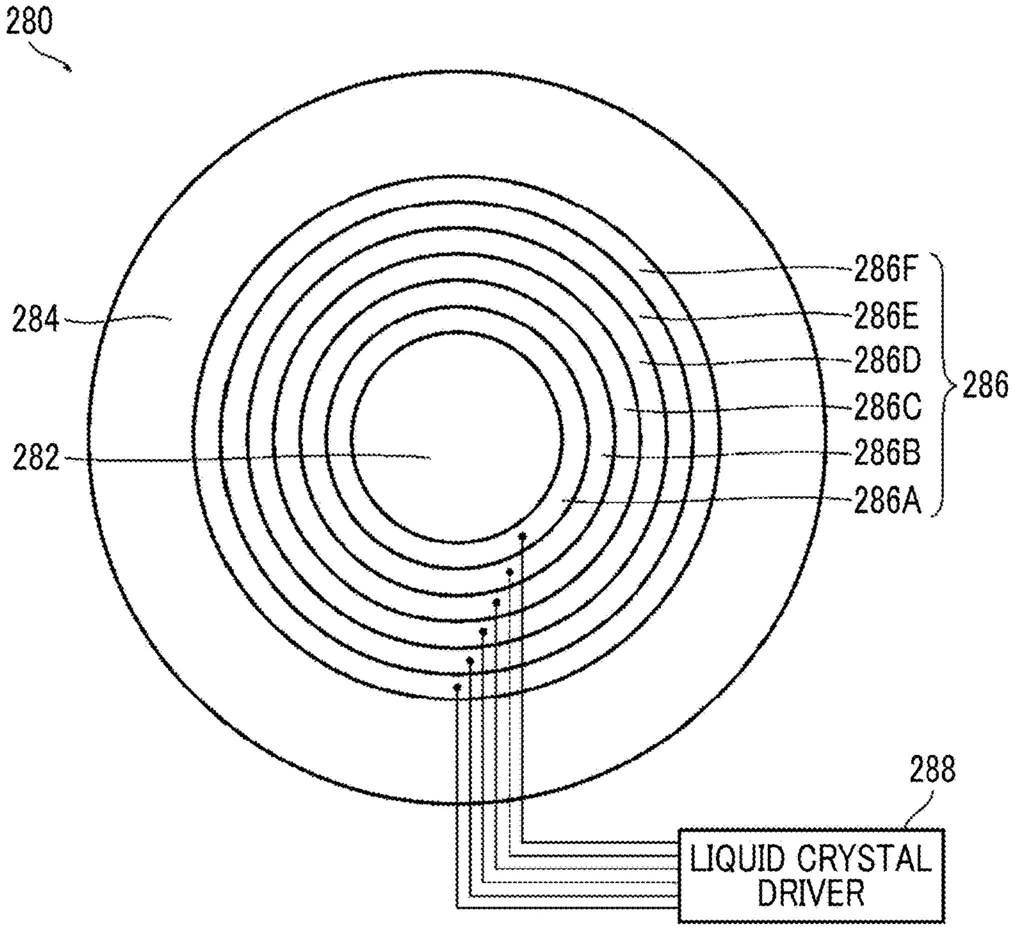
FIG. 29 is a front view illustrating an example of the second stop composed of liquid crystal elements.

FIG. 29 is a front view illustrating an example of the second stop composed of liquid crystal elements.

The second stop 280 of the present example is composed of liquid crystal elements such as STN liquid crystal, DSTN liquid crystal, or TFT liquid crystal.

The second stop 280 has a discoid shape. The second stop 280 comprises a central light transmitting region 282 having a circular shape in the central portion and an outer peripheral light transmitting region 284 having an annular shape in the outer peripheral portion. In addition, an annular light transmitting/blocking switch region 286 is provided between the central light transmitting region 282 and the outer peripheral light transmitting region 284.

The central light transmitting region 282 and the outer peripheral light transmitting region 284 are regions which have translucency and through which light is constantly transmitted.

The light transmitting/blocking switch region 286 is a region where it is possible to arbitrarily switch between the light transmitting state and the light blocking state. The light transmitting/blocking switch region 286 composes a second light blocking section in the light blocking state. The light transmitting/blocking switch region 286 is configured such that a plurality of annular regions 286A to 286F is concentrically combined. Each of the annular regions 286A to 286F is configured to he capable of individually switching between the light transmitting state and the light blocking state.

Each of the annular regions 286A to 286F composing the light transmitting/blocking switch region 286 is independently controlled by a liquid crystal driver 288 and is set in the light transmitting state or the light blocking state.

In the second stop 280 configured as described above, the aperture amount is adjusted by individually controlling the states of the respective annular regions 286A to 286F composing the light transmitting/blocking switch region 286.

Figure 30B:
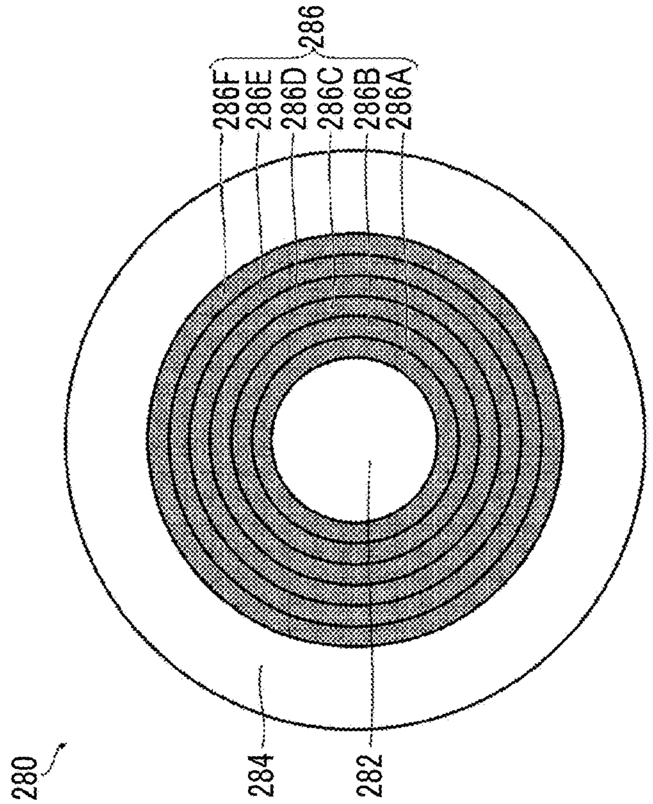
FIGS. 30A and 30B are explanatory diagrams of the operation of the second stop composed of liquid crystal elements.
Figure 30A:
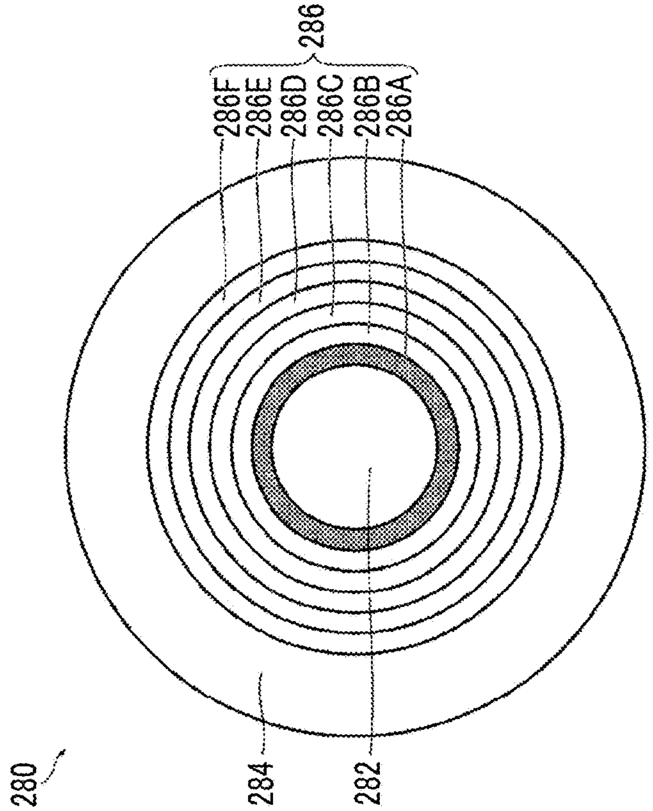

FIGS. 30A and 30B are explanatory diagrams of the operation of the second stop composed of liquid crystal elements. FIG. 30A shows a state in which the aperture of the stop is reduced by one stop, and FIG. 30B shows a state in which the aperture of the stop is minimized.

As shown in FIG. 30A, in a case where the aperture of the stop is reduced by one stop, the annular region 286A positioned to be closest to the inside of the light transmitting/blocking switch region 286 is set in the light blocking state, and the other annular regions 286B to 286F are set in the light transmitting state.

As shown in FIG. 30B, in a case where the aperture of the stop is minimized, all the annular regions 286A to 286F composing the light transmitting/blocking switch region 286 are in the light blocking state.

In this manner, in a case where the aperture of the second stop 280 is reduced, the annular regions 286A to 286F composing the light transmitting/blocking switch region 286 are blocked from light in order from the inside. As a result, the light blocking region expands outward.

<Other Examples of First Stop and Second Stop>

In the above-mentioned embodiment, the first stop and the second stop may be configured to be operated by actuators, but may be configured to be manually operated. For example, regarding the first stop, a lever may be provided on the first stop blade driving member, and the lever may be configured to be manually swung. Similarly, regarding the second stop, a lever may be provided on the second stop blade driving member, and the lever may be configured to be manually swung.

In a case where the first stop blade supporting member which composes the first stop blocks light passing through the second optical system, or in a case where the second stop blade supporting member which composes the second stop blocks light passing through the first optical system, it is preferable that these members are composed of a transparent material. Thereby, it is possible to reduce the effect of light blocking by the supporting member.

In the above-mentioned embodiment, in the first stop, the first cam grooves are configured to be provided on the side of the first stop blade driving member, and the first cam pins are configured to be provided on the side of the first stop blades. However, the first cam pins may be configured to be provided on the side of the first stop blade driving member, and the first cam grooves may be configured to be provided on the side of the first stop blades. Similarly, in the second stop, second cam grooves may be provided on the side of the second stop blade driving member, and second cam pins may be provided on the side of the second stop blades.

Third Embodiment

The lens device is configured such that the first optical system and the second optical system are movable along the optical axis, and thereby it is possible to perform focus adjustment. In this case, the first optical system and the second optical system are configured to be independently movable, and thereby focus adjustment of the first optical system and the second optical system can be performed independently.

[Configuration of Lens Device]

Figure 31:
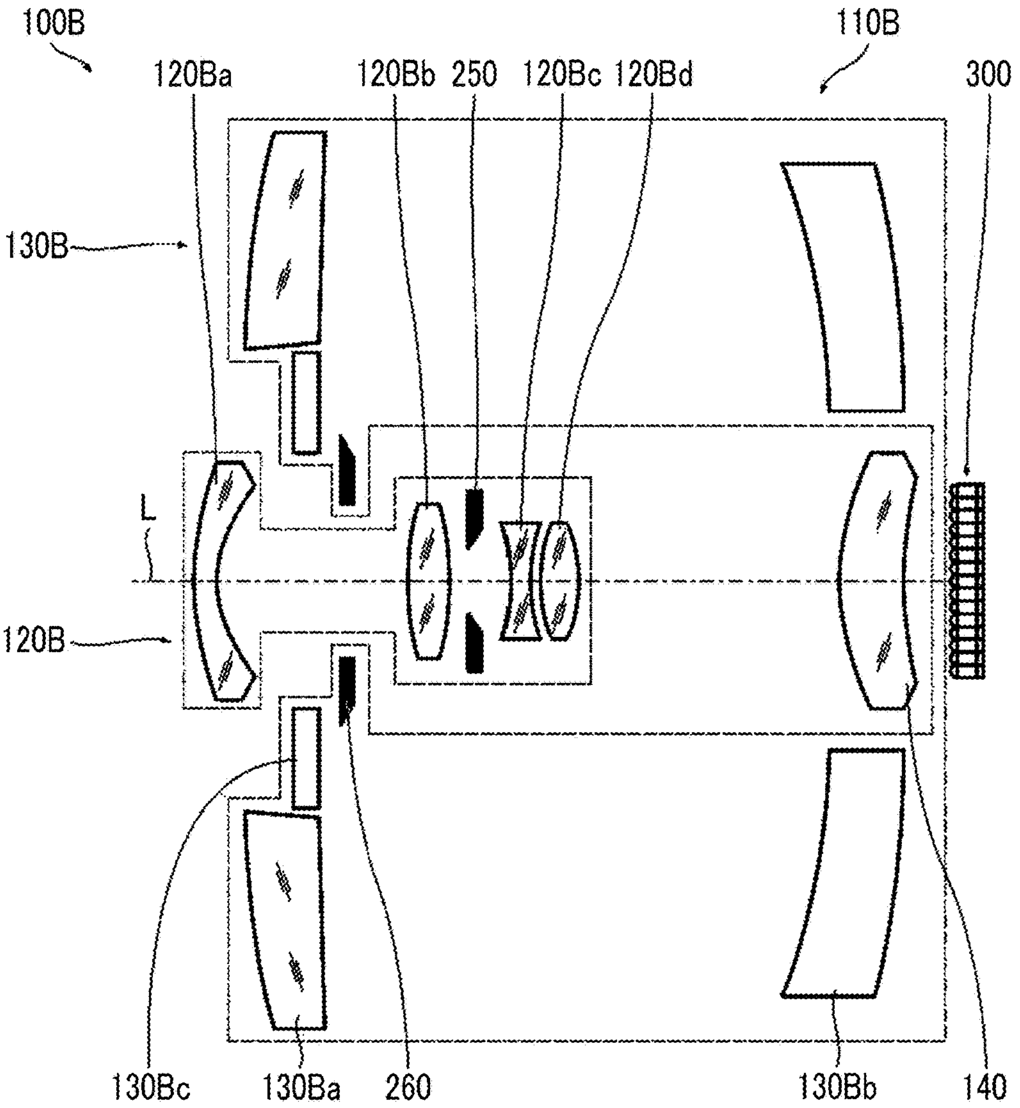
FIG. 31 is a schematic configuration diagram of the lens device which is configured such that the first optical system and the second optical system are movable along the optical axis.

FIG. 31 is a schematic configuration diagram of the lens device which is configured such that the first optical system and the second optical system are movable along the optical axis.

A basic configuration of a lens device 100B is the same as that of the lens device 100A shown in FIG. 17. In the lens device 100B, a first optical system 120B and a second optical system 130B composing an imaging optical system 110B are composed of optical systems having focal lengths different from each other, and a stop can be provided for each optical system. That is, the first stop 250, which adjusts the light amount of the first optical system 120B, and a second stop 260, which adjusts the light amount of the second optical system 130B, are provided.

The lens device 100B according to the present embodiment further comprises: a first optical system driving section (not shown in the drawing) that integrally moves the first optical system 120B and the first stop 250 along the optical axis L; and a second optical system driving section (not shown in the drawing) that integrally moves the second optical system 130B and the second stop 260 along the optical axis L.

<<First Optical System>>

The first optical system 120B is composed by combining a plurality of lenses. The wide-angle lens group composing the first optical system 120B is composed of a first wide-angle lens 120Ba, a second wide-angle lens 120Bb, a third wide-angle lens 120Bc, and a fourth wide-angle lens 120Bd. The first wide-angle lens 120Ba, the second wide-angle lens 120Bb, the third wide-angle lens 120Bc, and the fourth wide-angle lens 120Bd are arranged in order of the first wide-angle lens 120Ba, the second wide-angle lens 120Bb, the third wide-angle lens 120Bc, and the fourth wide-angle lens 120Bd from the subject side, and are arranged along the optical axis L, respectively. The light incident on the first optical system 120B passes through the first wide-angle lens 120Ba, the second wide-angle lens 120Bb, the third wide-angle lens 120Bc, and the fourth wide-angle lens 120Bd in this order, and is incident on the common lens 140.

<<Second Optical System>>

The second optical system 130B is disposed concentrically with the first optical system 120B. Consequently, the optical axis thereof is commonly used in the first optical system 120B.

The second optical system 130B is composed of a so-called reflection telephoto type optical system, and is composed by combining an annular lens and an annular mirror. The telephoto lens group composing the second optical system 130B is composed of a first telephoto lens 130Ba, a first telephoto mirror 130Bb, and a second telephoto mirror 130Bc. The first telephoto lens 130Ba, the first telephoto mirror 130Bb, and the second telephoto mirror 130Bc are arranged along the ray trajectories from the subject side to the image sensor 300 in order of the first telephoto lens 130Ba, the first telephoto mirror 130Bb, and the second telephoto mirror 130Bc, and are arranged along the optical axis L, respectively. The light incident on the second optical system 130B is transmitted through the first telephoto lens 130Ba, is reflected by the first telephoto mirror 130Bb, is further reflected by the second telephoto mirror 130Bc, and is incident on the common lens 140.

<<First Stop>>

A configuration of the first stop 250 is the same as the configuration of the first stop 250 described as a modification example of the second embodiment. The first stop 250 is disposed between the second wide-angle lens 120Ab and the third wide-angle lens 120Ac composing the first optical system 120A.

<<Second Stop>>

A configuration of the second stop 260 is the same as the configuration of the second stop 260 described as a modification example of the second embodiment. The second stop 260 adjusts the light amount of light passing through the second optical system 130A. The second stop 260 is disposed on the optical axis L and is disposed immediately behind the second telephoto mirror 130Ac composing the second optical system 130A.

<<First Optical System Driving Section>>

The first optical system driving section integrally moves the first optical system 120B and the first stop 250 along the optical axis L.

The first optical system 120B and the first stop 250 are held by a first optical system holding member which is not shown. The first optical system driving section is composed of, for example, a cam mechanism and a feed screw mechanism, and moves the first optical system holding member along the optical axis L.

Figure 32A:
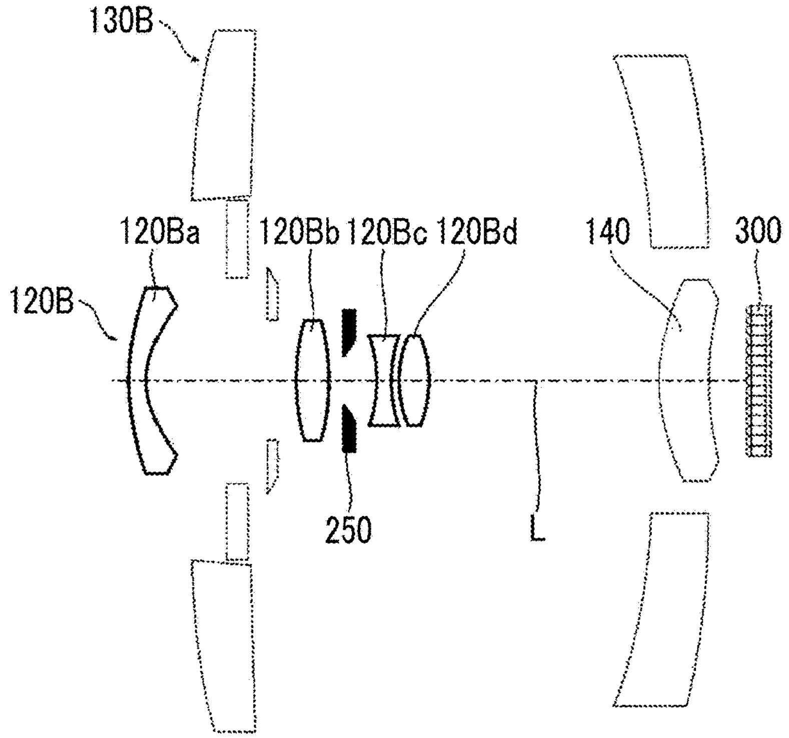
FIGS. 32A and 32B are explanatory diagrams of the operation of the first optical system driven by the first optical system driving section.
Figure 32B:
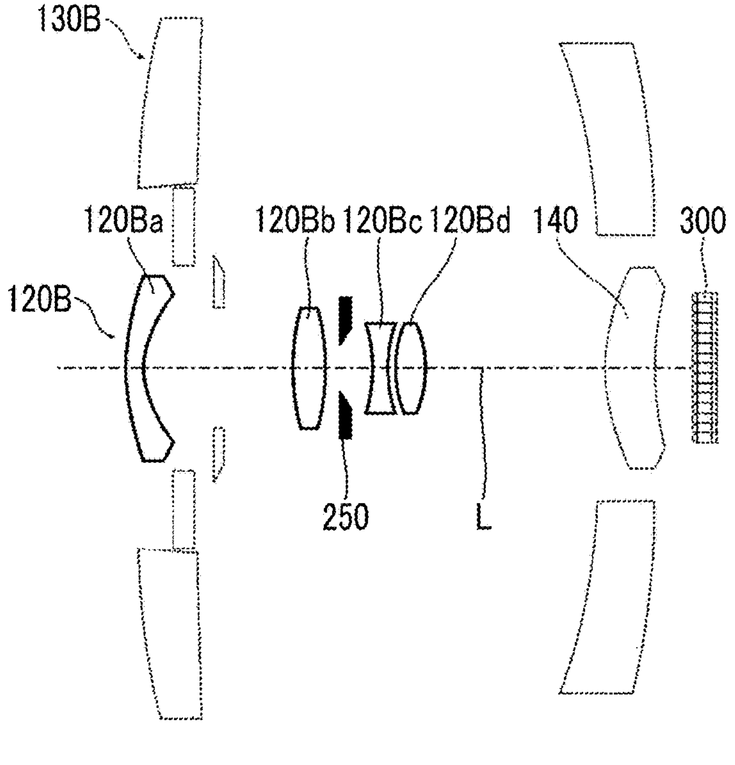

FIGS. 32A and 32B are explanatory diagrams of the operation of the first optical system driven by the first optical system driving section.

As shown in the drawing, the first optical system 120B and the first stop 250 integrally move back and forth on the optical axis L.

<<Second Optical System Driving Section>>

The second optical system driving section integrally moves the second optical system 130B and the second stop 260 along the optical axis L.

The second optical system 130B and the second stop 260 are held by a second optical system holding member which is not shown. The second optical system driving section is composed of, for example, a cam mechanism and a feed screw mechanism, and moves the second optical system holding member along the optical axis L.

Figure 33A:
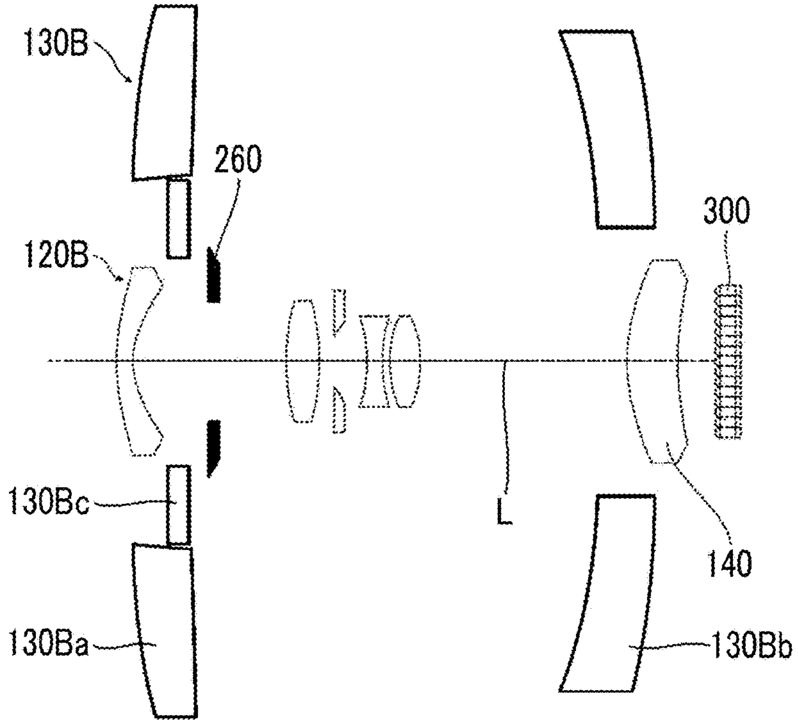
FIGS. 33A and 33B are explanatory diagrams of the operation of the second optical system driven by the second optical system driving section.
Figure 33B:
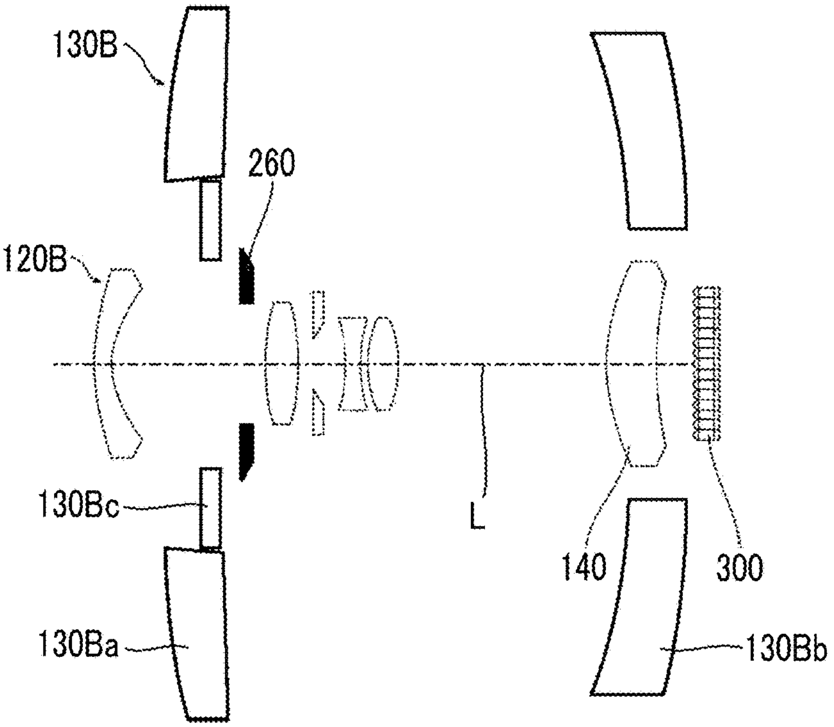

FIGS. 33A and 33B are explanatory diagrams of the operation of the second optical system driven by the second optical system driving section.

As shown in the drawing, the second optical system 130B and the second stop 260 integrally move back and forth on the optical axis L.

[Operation of Lens Device]

According to the lens device 100B of the present embodiment, the first optical system 120B and the second optical system 130B are provided to be independently movable. Thereby, the first optical system 120B and the second optical system 130B are able to individually perform focus adjustment.

[Modification Example of Imaging Apparatus of Third Embodiment]

In a case where one stop is commonly used in the first optical system and the second optical system as in the imaging apparatus 10A shown in FIG. 13, in a case where the first optical system and the second optical system are independently moved, the stop are configured as follows.

(1) A Case Where the Stop Moves Integrally With the First Optical System

The stop moves integrally with the first optical system. In this case, the stop is provided in the first optical system holding member that holds the first optical system, and moves integrally with the first optical system.

(2) A Case Where the Stop Moves Integrally With the Second Optical System

The stop moves integrally with the second optical system. In this case, the stop is provided in the second optical system holding member that holds the second optical system, and moves integrally with the second optical system.

(3) A Case Where the Stop Moves in Conjunction With the First Optical System and the Second Optical System The stop moves in conjunction with the first optical system and the second optical system. In this case, the stop moves to the optimum position in conjunction with the movement of both the first optical system and the second optical system.

(4) A Case Where the Stop Remains Stationary

The stop remains stationary at a certain position. In this case, even in a case where the first optical system and the second optical system move, the stop is constantly kept stationary at a certain position.

Fourth Embodiment

As described above, the stop is disposed to block light at the boundary between the pupil regions of the first optical system and the second optical system, and thereby it is possible to suppress interference. The effect of interference suppression by this stop becomes higher as the aperture of the stop is reduced.

On the other hand, the effect of interference can be eliminated from the image in which interference has occurred, through image processing.

Accordingly, by eliminating the effect of interference which can not be eliminated by the stop through image processing, it is possible to acquire a higher quality image.

Hereinafter, a method of eliminating the effect of interference through image processing will be described.

<<Mechanism of Occurrence of Interference>>

First, deterioration in image quality caused by interference will be described. It should be noted that the case where an image is captured by the imaging apparatus 10A according to the second embodiment will be described herein as an example.

Figure 34B:
FIGS. 34A and 34B are diagrams illustrating examples of images in which interference has occurred.
Figure 34A:

FIGS. 34A and 34B are diagrams illustrating examples of images in which interference has occurred. FIG. 34A shows an example of a first wide-angle image captured by the first optical system 120A, and FIG. 34B shows an example of a second telephoto image captured by the second optical system 130A.

In a case where separability of the light received by each pixel of the image sensor 300 is insufficient, the signal of the image component, which should not be received, is mixed in the output of each pixel of the image sensor 300. As a result, as shown in FIG. 34, each image in which one image is superimposed on the other image is captured.

Figure 35:
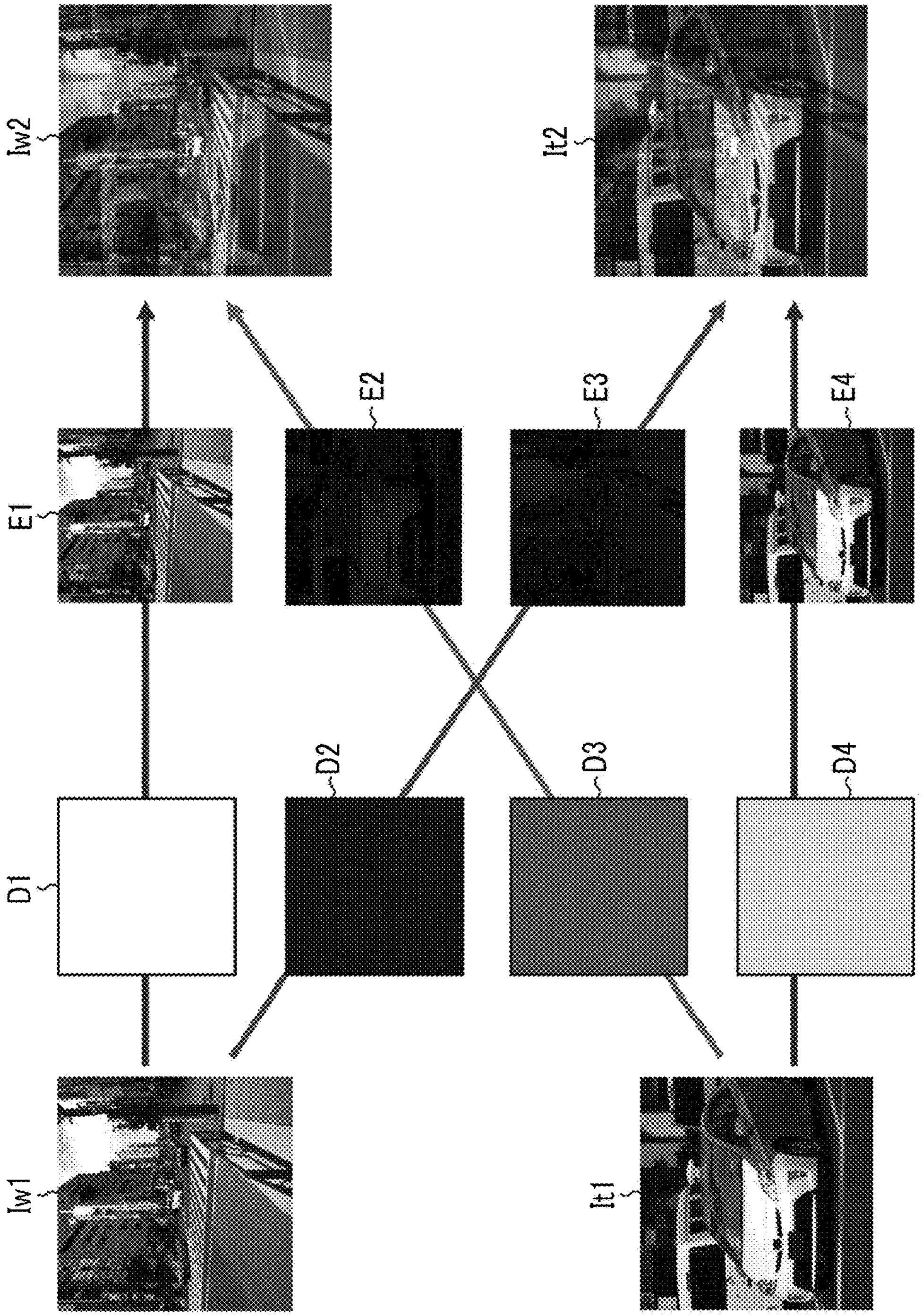
FIG. 35 is a conceptual diagram for explaining a mechanism of interference.

FIG. 35 is a conceptual diagram for explaining a mechanism of interference.

In FIG. 35, the symbol "Iw1" indicates a first original image of wide angle, and the symbol "It1" indicates a second original image of telephoto. The "first original image Iw1" and "second original image It1" mentioned here are images captured in a state in which no interference occurs. On the other hand, the symbol "Iw2" indicates an image (first output image) generated from the signal which is actually output from the first pixels 310A of the image sensor 300, and the symbol "It2" indicates an image (second output image) generated from the signal which is actually output from the second pixels 310B of the image sensor 300.

In a case where the first image and the second image are captured by the imaging apparatus 10A, if separability of the light received by each pixel of the image sensor 300 is sufficient, an image signal representing the first original image Iw1 is output from the first pixels 310A, and an image signal representing the second original image It1 is output from the second pixels 310B.

However, as described above, in a case where the light separability is insufficient, as in the first output image Iw2 and the second output image It2, image signals representing multiplexed images, in which the first and second images are mixed, are output from the first pixels 310A and the second pixels 310B.

For example, among the first image light representing the first original image Iw1, distribution information (indication) indicating a component of light appropriately received by the first pixels 310A is referred to as "first detection gain distribution D1", distribution information (indication) indicating a component of light inappropriately received by the second pixels 310B is referred to as "first interference gain distribution D2". Further, among the second image light representing the second original image It1, distribution information (indication) indicating a component of light inappropriately received by the first pixels 310A is referred to as "second interference gain distribution D3", and distribution information (indication) indicating a component of light appropriately received by the second pixels 310B is referred to as "second detection gain distribution D4".

Here, a first image component, which is obtained by applying the first detection gain distribution D1 to the first original image Iw1 and received by the first pixels 310A, is referred to as a "first original image component E1". A second image component, which is obtained by applying the second interference gain distribution D3 to the second original image It1 and received by the first pixels 310A, is referred to as a "second interference image component E2". A first image component, which is obtained by applying the first interference gain distribution D2 to the first original image Iw1 and received by the second pixels 310B, is referred to as a "first interference image component E3". A second image component, which is obtained by applying the second detection gain distribution D4 to the second original image It1 and received by the second pixels 310B, is referred to as a "second original image component E4".

In this case, the first output image Iw2 generated on the basis of the image signal, which is output from the first pixels 310A, is on the basis of an image obtained by adding the first original image component E1 and the second interference image component E2. The second output image It2 generated on the basis of the image signal, which is output from the second pixels 310B, is on the basis of an image obtained by adding the first interference image component E3 and the second original image component E4.

As the separation performance of the light received by each pixel of the image sensor 300 is better, a component proportion of the second interference image component E2 and the first interference image component E3 is closer to zero (blank), and the first output images Iw2 and the second output image It2 are closer to the first original image Iw1 and the second original image It1, respectively.

On the other hand, as the light separation performance deteriorates, the component proportion of the second interference image component E2 and the first interference image component E3 increases, the proportion of the second interference image component E2 increases in the first output image Iw2, and the proportion of the first interference image component E3 increases in the second output image It2.

As described above, the image signal, which is output from the image sensor 300 in a case where there is interference, corresponds to a result which is obtained by adding the image component obtained by applying the detection gain distribution to the original image and the image component obtained by applying the interference gain distribution to a different-channel image. Due to such interference, an image (image signal), in which the first image and the second image are superimposed, is output from the imaging apparatus in which the light separation performance is not sufficient.

<<Image Processing Method>>

Next, a method of eliminating the effect of interference from the first image and the second image through image processing will be described.

Here, a description will be given of an exemplary case of performing correction processing on both the first image and the second image on the basis of the inverse matrix of the matrix composed of the detection gain distribution and the interference gain distribution of the first image and the second image.

Figure 36:
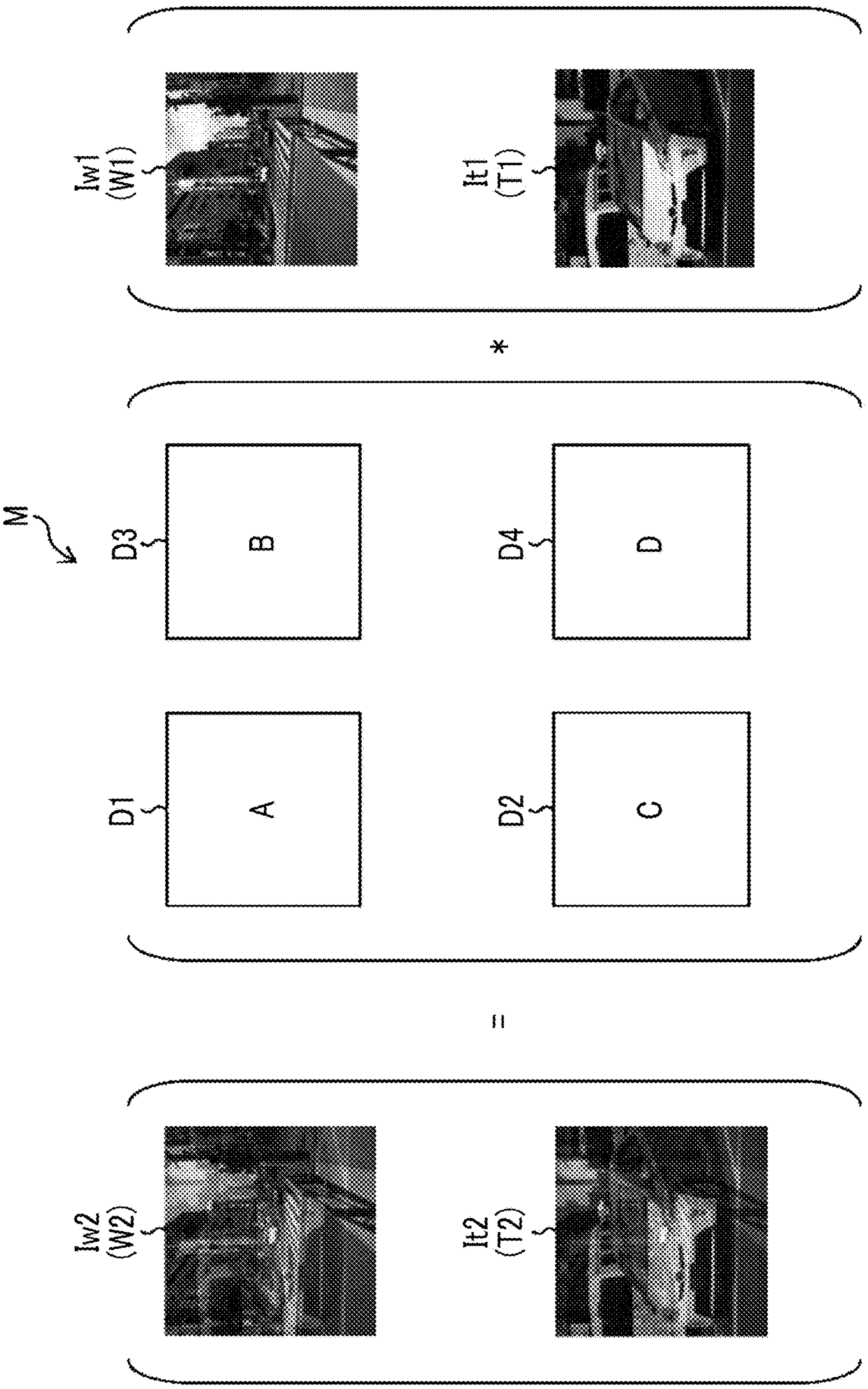
FIG. 36 is a diagram illustrating a relationship of a first original image Iw1, a second original image It1, a first output image Iw2, a second output image It2, and a matrix M composed of detection gain distribution and interference gain distribution.

FIG. 36 is a diagram illustrating a relationship of the first original image Iw1, the second original image It1, the first output image Iw2, the second output image It2, and the matrix M composed of the detection gain distribution and the interference gain distribution.

The "first original image Iw1", the "second original image It1", the "first output image Iw2", and the "second output image It2" shown in FIG. 36 correspond to the "first original image Iw1", the "second original image It1", the "first output image Iw2", and the "second output image It2"

shown in FIG. 35. It should be noted that "W1", "W2", "T1", and "T2" in FIG. 36 will be described later.

The first output image Iw2 and the second output image It2 generated from the image signals, which are output from the image sensor 300, are represented by a product of "the matrix M composed of the detection gain distribution and the interference gain distribution" and "the first original image Iw1 and the second original image It1 which are the first and second original images generated by the light passing through the first optical system 120A and the second optical systems 130A, respectively".

The matrix M composed of the detection gain distribution and the interference gain distribution is a 2×2 matrix composed of the first detection gain distribution D1, the first interference gain distribution D2, the second interference gain distribution D3, and the second detection gain distribution D4.

The "first detection gain distribution D1", the "first interference gain distribution D2", the "second interference gain distribution D3", and the "second detection gain distribution D4" respectively correspond to "the first detection gain distribution D1", "first interference gain distribution D2", "second interference gain distribution D3", and "second detection gain distribution D4" shown in FIG. 35.

Figure 37:
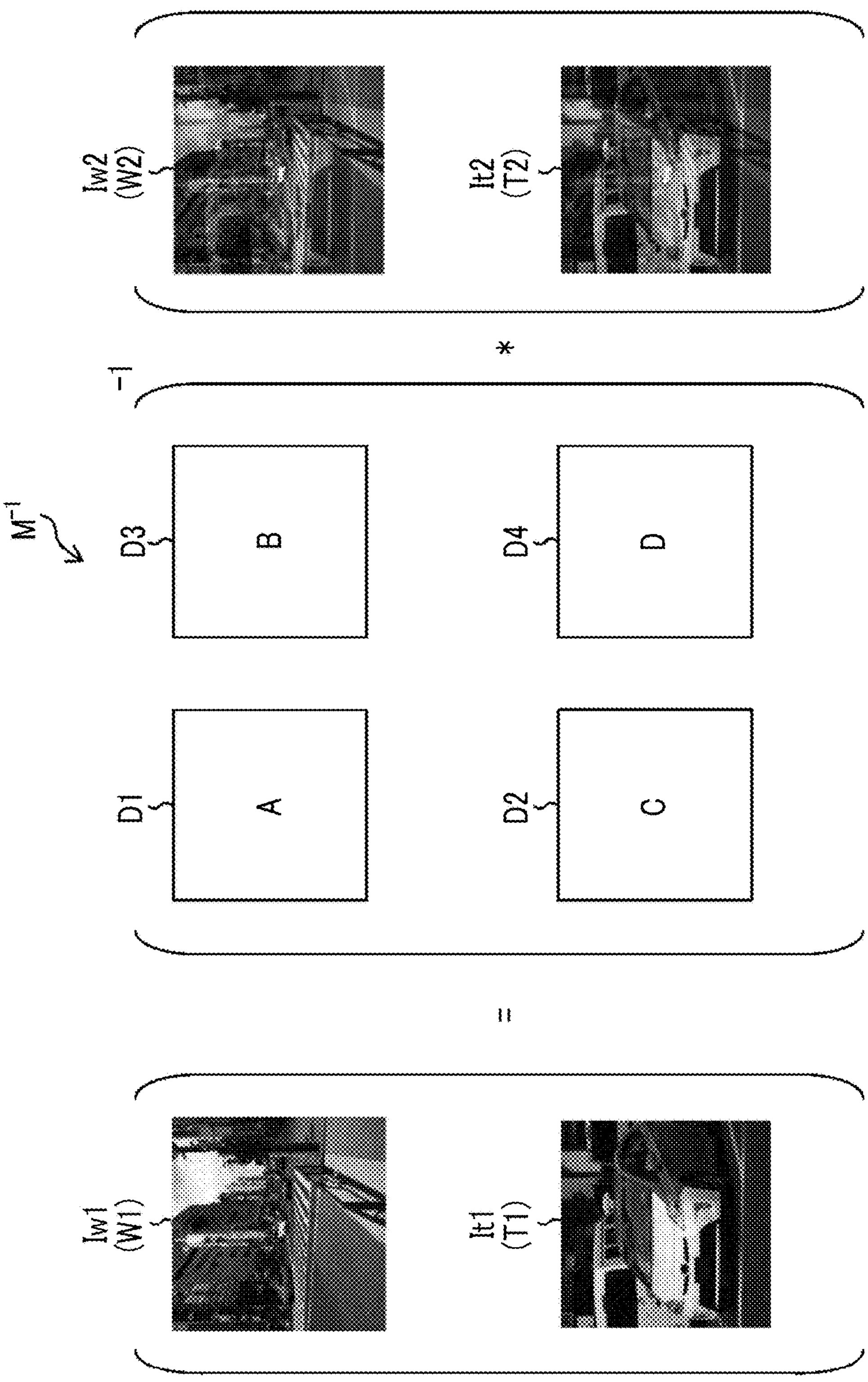
FIG. 37 is a diagram illustrating a determinant obtained by applying the inverse matrix $M^{-1}$ of "the matrix M composed of detection gain distribution and interference gain distribution" to the determinant shown in FIG. 36.

FIG. 37 is a diagram illustrating a determinant obtained by applying the inverse matrix $M^{-1}$ of "the matrix M composed of detection gain distribution and interference gain distribution" to the determinant shown in FIG. 36.

As shown in FIG. 37, it is possible to acquire "the first image Iw1 and the second original image It1 which are the first and second original images" through a product of the inverse matrix $M^{-1}$ of "the matrix M composed of the detected gain distribution and the interference gain distribution" and "the first output image Iw2 and the second output image It2 generated from the image signals, which are output from the image sensor 300.

FIG. 38 is a diagram illustrating a determinant expressing the determinant of FIG. 37 in a simplified manner.

In FIG. 38, "W1" collectively represents the pixel components (pixel values) of the first original image Iw1, and "T1" collectively represents the pixel components of the second original image It1. "W2" collectively represents the pixel components of the first output image Iw2, and "T2" collectively represents the pixel components of the second output image It2.

Further, in FIG. 38, "A", "B", "C", and "D" collectively represents elements composing the first detection gain distribution D1, the second interference gain distribution D3, the first interference gain distribution D2, and the second detection gain distribution D4.

FIG. 39 is a diagram illustrating elements w1_11 to w1_mn composing "W1" shown in FIG. 38.

"W1" is composed of elements w1_11 to w1_mn corresponding to the pixel components (pixel values) of the first original image Iw1.

It should be noted that "m" and "n" each represent an integer of 2 or more. "m" and "n" may be the same or different.

Likewise, "W2", "T1", and "T2" shown in FIG. 38 are also respectively composed of elements w2_11 to w2_mn, t1_11 to t1_mn, and t2_11 to t2_mn corresponding to the pixel components (pixel values) of the first output image Iw2, the second original image It1, and the second output image It2 (not shown in the drawing).

In addition, "A", "B", "C", and "D" shown in FIG. 38 are also respectively composed of elements a11 to amn, b11 to bmn, and c11 to cmn, and d11 to dmn determined in accordance with the respective pixels of the first image and the second image (not shown in the drawing).

FIG. 40 is a diagram illustrating a calculation expression of "w1_ij" derived on the basis of the determinant shown in FIG. 38. Further, FIG. 41 is a diagram illustrating a calculation expression of "t1_ij" derived on the basis of the determinant shown in FIG. 38.

In FIGS. 40 and 41, "i" represents any one integer of 1 to m, and "j" represents any one integer of 1 to n. As shown in FIGS. 40 and 41, elements w1_11 to w1_mn corresponding to the pixel components (pixel values) of the first original image Iw1 and elements t1_11 to tl_mn corresponding to the pixel components (pixel values) of the second original image It1 can be calculated from the first output image Iw2, the second output image It2, and the inverse matrix $M^{-1}$.

The effect of interference can be eliminated by correcting both image data pieces of the first image and the second image, on the basis of the arithmetic expression represented by FIGS. 40 and 41.

The correction processing is performed in the digital signal processing section 404. That is, the digital signal processing section 404 functions as an image signal processing section, and performs processing of eliminating the effect of interference given by the second optical system from the first image and processing of eliminating the effect of interference given by the first optical system from the second image.

On the basis of the arithmetic expressions shown in FIGS. 40 and 41, the digital signal processing section 404 performs correction processing on both of the first image and the second image data, and executes processing of reducing the effect of "the second image component mixed in the first image" and the effect of "the first image component mixed in the second image".

From the viewpoint of precise correction processing, it is preferable that the detection gain distribution and the interference gain distribution are composed of the same number of elements as the number of pixels composing each of the first image and the second image, and the inverse matrix $M^{-1}$ of each element (each corresponding pixel) composing the detection gain distribution and the interference gain distribution is used in the digital signal processing section 404. However, as in a case of small shading, in a case where "the elements composing the detection gain distribution and the interference gain distribution" are approximated to "a part or all of the pixels composing the first image and the second image", from the viewpoint of giving priority to costs in calculation, "elements composing the detected gain distribution and the interference gain distribution" may be represented by common representative values in an approximate range. Therefore, in a case where "all of the pixels composing the first image and the second image" are approximated, the detection gain distribution and the interference gain distribution can be represented by a single representative value. Thus, "the correction processing based on the inverse matrix of the matrix composed of the detection gain distribution and the interference gain distribution" can be performed through a simple process at high speed.

The matrix M (refer to "A", "C", "B", and "D" in FIG. 38) based on the first detection gain distribution D1, the first interference gain distribution D2, the second interference gain distribution D3, and the second detection gain distribution D4 is determined by the lens device and the image sensor to be used. The imaging apparatus stores and holds the elements of the inverse matrix $M^{-1}$ derived in advance from this matrix M, and is able to reduce the effect of the second image light in the first image and to reduce the effect of the first image light in the second image by applying the stored and held elements of the inverse matrix $M^{-1}$ to the first output image Iw2 and the second output image It2.

Further, "the correction processing based on the inverse matrix $M^{-1}$ of the matrix M composed of the detection gain distribution and the interference gain distribution" (hereinafter referred to as interference reduction processing) in the above-mentioned digital signal processing section 404 is performed on both image data pieces of the first image and the second image, but the present invention is not limited thereto. Both the first image data and the second image data generated by the digital signal processing section 404 may be temporarily stored in the internal memory 406 which is not shown, and the digital signal processing section 404 may read both image data pieces from the image storage section, and may perform correction processing.

In addition, the interference reduction processing in the above-mentioned digital signal processing section 404 is actually performed for each color channel composing both image data pieces of the first image and the second image. The digital signal processing section 404 stores and holds "the inverse matrix $M^{-1}$ of the matrix M composed of the detection gain distribution and the interference gain distribution" for each of the color channels. For example, a description will be given of an exemplary case where the image sensor 300 has R, G, and B color filters and both the first image and the second image composed of RGB data are output as image signals from the image sensor 300. In this case, the digital signal processing section 404 holds "the inverse matrix $M^{-1}$ of the matrix M composed of the detection gain distribution and the interference gain distribution" for each color channel of RGB, and applies the inverse matrix $M^{-1}$ to the first output image Iw2 and the second output image It2.

Figure 42B:
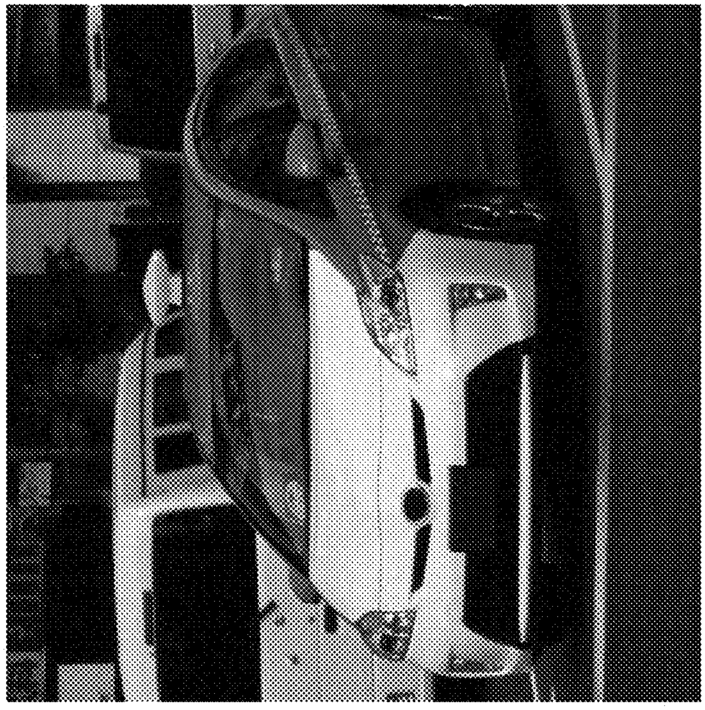
FIGS. 42A and 42B are diagrams illustrating examples of the first image and the second image obtained in a case where interference reduction processing is performed.
Figure 42A:
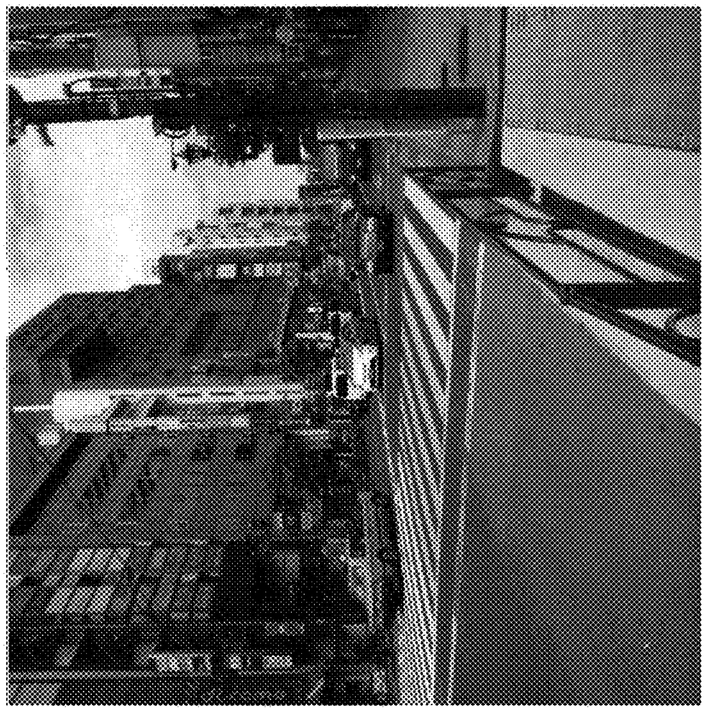

FIGS. 42A and 42B are diagrams illustrating examples of the first image and the second image obtained in a case where interference reduction processing is performed. It is to be noted that FIG. 42A shows the first image obtained in a case where the interference reduction processing is performed, and FIG. 42B shows the second image obtained in a case where the interference reduction processing is performed.

As shown in FIG. 42, in the first image and the second image after the interference reduction processing, compared with the state before the interference reduction processing (refer to FIG. 34), it is possible to reduce the effect of "the second image component mixed in the first image" or the effect of "the first image component mixed in the second image". As a result, it is possible to acquire high quality image quality superior in visibility as a whole.

<<Modification Example>>

As described above, the stop is disposed to block light at the boundary between the pupil regions of the first optical system and the second optical system, and thereby it is possible to suppress interference. The effect of interference suppression by this stop becomes higher as the aperture of the stop is reduced. Accordingly, the interference reduction processing may be switched on or off in accordance with the aperture value. That is, in a case of stopping down more than a certain amount, that is, in a case of stopping down to a range where interference does not occur, the interference reduction processing is turned off. Thereby, it is possible to prevent overcorrection, and it is possible to capture higher quality images.

Further, the image processing parameters may be changed in accordance with the aperture value, that is, in accordance with the light amount to be adjusted by the stop. In the above-mentioned example, the element values of the matrix used in image processing are changed in accordance with the aperture value. Thereby, it is possible to appropriately correct the image in accordance with the interference ratio, and it is possible to acquire higher quality images.

Other Embodiments

<<Another Embodiment of Lens Device>>

The first optical system and the second optical system composing the lens device may be composed of optical systems having imaging characteristics different from each other. For example, in addition to the configuration shown in the above embodiment, the first optical system and the second optical system may be composed of optical systems having transmission wavelength characteristics different from each other. In this case, for example, the first optical system is composed of an optical system having transmission wavelength characteristics suitable for imaging with visible light, and the second optical system is composed of an optical system having transmission wavelength characteristics suitable for imaging with infrared light. Thereby, the visible light image can be captured through the first optical system, and the infrared image can be captured through the second optical system.

Another Embodiment

The imaging apparatus may be configured as a single camera, and may be incorporated in other apparatuses. For example, the imaging apparatus may be incorporated in a smartphone, a tablet type computer, a notebook type computer.

The application as an imaging apparatus is also not particularly limited, and the imaging apparatus may be used for not only usual camera applications but also applications such as surveillance cameras and in-vehicle cameras.

Further, the lens device may be configured to be operated manually, or may be configured to be operated automatically. For example, except for a case where the stop is composed of liquid crystal elements, the stop may be configured to be operated manually or may be configured to be operated automatically by using an actuator. Further, the mechanism for moving the optical system along the optical axis may be configured to be operated manually, or may be configured to be operated automatically by using an actuator.

EXPLANATION OF REFERENCES

10: imaging apparatus, 10A: imaging apparatus, 100: lens device, 100A: lens device, 100B: lens device, 110: imaging optical system, 110A: imaging optical system, 110B: imaging optical system, 120: first optical system, 120A: first optical system, 120 Ab: second wide-angle lens, 120 Ac: third wide-angle lens, 120 Ad: fourth wide-angle lens, 120B: first optical system, 120 Ba: first wide-angle lens, 120 Bb: second wide-angle lens, 120 Bc: third wide-angle lens, 120 Bd: fourth wide-angle lens, 130: second optical system, 130A: second optical system, 130Aa: first telephoto lens, 130Ab: first telephoto mirror, 130Ac: second telephoto mirror, 130B: second optical system, 130 Ba: first telephoto lens, 130 Bb: first telephoto mirror, 130 Bc: second telephoto mirror, 140: common lens, 200: stop, 202: stop blade, 202A: first blade portion, 202B: second blade portion, 202C: swing shaft, 202D: cam groove, 204: stop blade supporting member, 204A: inner frame, 204B: outer frame, 204C: support arm, 204D: bearing, 206: stop blade driving member, 206A: fitting portion, 206B: cam pin, 208: light blocking section, 220: stop, 222: central light transmitting region, 224: outer peripheral light transmitting region, 226: light transmitting/blocking switch region, 226A to 226G: annular region, 228: liquid crystal driver, 250: first stop, 252: first stop blade, 252A: first swing shaft, 252B: first cam pin, 254: first stop blade supporting member, 254A: bearinghole, 256: first stop blade driving member, 256A: first cam groove, 258: first light blocking section, 260: second stop, 262: second stop blade, 262B: second cam groove, 264: second stop blade supporting member, 264A: inner frame, 264B: outer frame, 264C: support arm, 264D: bearing, 266: second stop blade driving member, 266A: fitting portion, 266B: second cam pin, 268: second light blocking section, 270: first stop, 272: light transmitting region, 274: light transmitting/blocking switch region, 274A to 274F: annular region, 276: liquid crystal driver, 280: second stop, 282: central light transmitting region, 284: outer peripheral light transmitting region, 286: light transmitting/blocking switch region, 286A to 286F: annular region, 288: liquid crystal driver, 300: image sensor, 310A: first pixel, 310B: second pixel, 312: micro lens, 314: light blocking mask, 401: lens driving control section, 402: image sensor driving control section, 403: analog signal processing section, 404: digital signal processing section, 405: display section, 406: internal memory, 407: media interface, 408: system control section, 409: operation section, 410: external memory, L: optical axis

What is claimed is:

1. An imaging apparatus comprising:

an imaging optical system that is configured such that a first optical system and a second optical system having imaging characteristics different from each other are combined concentrically;

an image sensor that has a plurality of pixels composed of photoelectric conversion elements two-dimensionally arranged, respectively pupil-divides light incident through the first optical system and light incident through the second optical system, and selectively receives the light through the pixels;

an image signal acquisition section that acquires an image signal of a first image obtained through the first optical system and an image signal of a second image obtained through the second optical system, from the image sensor; and a stop that has an annular light blocking section of which an inner diameter and an outer diameter are capable of being increased or decreased, and adjusts a light amount of the light passing through the first optical system and the second optical system by increasing or decreasing the inner diameter and the outer diameter of the light blocking section at a boundary between pupil regions of the first optical system and the second optical system.

2. The imaging apparatus according to claim 1, wherein the first optical system and the second optical system have focal lengths different from each other.

3. The imaging apparatus according to claim 1, wherein the first optical system and the second optical system have focusing distances different from each other.

4. The imaging apparatus according to claim 1, wherein the first optical system and the second optical system have transmission wavelength characteristics different from each other.

5. The imaging apparatus according to claim 1, wherein the stop is composed of liquid crystal elements.

6. The imaging apparatus according to claim 2, wherein the stop is composed of liquid crystal elements.

7. The imaging apparatus according to claim 3, wherein the stop is composed of liquid crystal elements.

8. The imaging apparatus according to claim 4, wherein the stop is composed of liquid crystal elements.

9. The imaging apparatus according to claim 1, wherein the stop has a plurality of fulcrums that are arranged with regular intervals on a same circumference, a plurality of stop blades that are swingably supported by the fulcrums, are arranged to overlap, and compose the light blocking section, and a stop blade driving section that swings the stop blades synchronously, and wherein the inner diameter and the outer diameter of the light blocking section are increased or decreased by swinging the stop blades synchronously through the stop blade driving section.

10. The imaging apparatus according to claim 2, wherein the stop has a plurality of fulcrums that are arranged with regular intervals on a same circumference, a plurality of stop blades that are swingably supported by the fulcrums, are arranged to overlap, and compose the light blocking section, and a stop blade driving section that swings the stop blades synchronously, and wherein the inner diameter and the outer diameter of the light blocking section are increased or decreased by swinging the stop blades synchronously through the stop blade driving section.

11. The imaging apparatus according to claim 3, wherein the stop has a plurality of fulcrums that are arranged with regular intervals on a same circumference, a plurality of stop blades that are swingably supported by the fulcrums, are arranged to overlap, and compose the light blocking section, and a stop blade driving section that swings the stop blades synchronously, and wherein the inner diameter and the outer diameter of the light blocking section are increased or decreased by swinging the stop blades synchronously through the stop blade driving section.

12. The imaging apparatus according to claim 4, wherein the stop has a plurality of fulcrums that are arranged with regular intervals on a same circumference, a plurality of stop blades that are swingably supported by the fulcrums, are arranged to overlap, and compose the light blocking section, and a stop blade driving section that swings the stop blades synchronously, and wherein the inner diameter and the outer diameter of the light blocking section are increased or decreased by swinging the stop blades synchronously through the stop blade driving section.

13. The imaging apparatus according to claim 1, wherein the stop is configured to have, on a same axis, a first stop that has a first light blocking section which has an annular shape and of which an inner diameter is increased or decreased, and a second stop that has a second light blocking section which has an annular shape and of which an outer diameter is increased or decreased, wherein the first stop adjusts a light amount of light passing through the first optical system, and wherein the second stop adjusts a light amount of light passing through the second optical system.

14. The imaging apparatus according to claim 2, wherein the stop is configured to have, on a same axis, a first stop that has a first light blocking section which has an annular shape and of which an inner diameter is increased or decreased, and a second stop that has a second light blocking section which has an annular shape and of which an outer diameter is increased or decreased, wherein the first stop adjusts a light amount of light passing through the first optical system, and wherein the second stop adjusts a light amount of light passing through the second optical system.

15. The imaging apparatus according to claim 3, wherein the stop is configured to have, on a same axis, a first stop that has a first light blocking section which has an annular shape and of which an inner diameter is increased or decreased, and a second stop that has a second light blocking section which has an annular shape and of which an outer diameter is increased or decreased, wherein the first stop adjusts a light amount of light passing through the first optical system, and wherein the second stop adjusts a light amount of light passing through the second optical system.

16. The imaging apparatus according to claim 4, wherein the stop is configured to have, on a same axis, a first stop that has a first light blocking section which has an annular shape and of which an inner diameter is increased or decreased, and a second stop that has a second light blocking section which has an annular shape and of which an outer diameter is increased or decreased, wherein the first stop adjusts a light amount of light passing through the first optical system, and wherein the second stop adjusts a light amount of light passing through the second optical system.

17. The imaging apparatus according to claim 13, wherein the first stop has a plurality of first fulcrums that are arranged with regular intervals on a same circumference, a plurality of first stop blades that are swingably supported by the first fulcrums, are disposed to overlap, and compose the first light blocking section, and a first stop blade driving section that swings the first stop blades synchronously, and wherein the inner diameter of the first light blocking section is increased or decreased by swinging the first stop blades synchronously through the first stop blade driving section.

18. The imaging apparatus according to claim 13, wherein the second stop has a plurality of second fulcrums that are arranged with regular intervals on a same circumference, a plurality of second stop blades that arc swingably supported by the second fulcrums, are disposed to overlap, and compose the second light blocking section, and a second stop blade driving section that swings the second stop blades synchronously, and wherein the outer diameter of the second light blocking section is increased or decreased by swinging the second stop blades synchronously through the second stop blade driving section.

19. The imaging apparatus according to claim 1, further comprising an image signal processing section that acquires an image signal of the first image and an image signal of the second image, and performs processing of eliminating an effect of interference caused by the second optical system from the first image and processing of eliminating an effect of interference caused by the first optical system from the second image.

20. The imaging apparatus according to claim 19, wherein the image signal processing section changes image processing parameters in accordance with a light amount adjusted by the stop.

* * * * *